US012608816B2

(12) United States Patent
Tropin et al.

(10) Patent No.: US 12,608,816 B2
(45) Date of Patent: Apr. 21, 2026

(54) ADVANCED HOUGH-BASED ON-DEVICE DOCUMENT LOCALIZATION

(71) Applicant: Smart Engines Service, LLC, Moscow (RU)

(72) Inventors: Daniil Vyacheslavovich Tropin, Vologda (RU); Aleksandr Mikhailovich Ershov, Ulyanovsk (RU); Dmitry Petrovich Nikolaev, Moscow (RU); Vladimir Viktorovich Arlazarov, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 628 days.

(21) Appl. No.: 17/980,029

(22) Filed: Nov. 3, 2022

(65) Prior Publication Data

US 2023/0137300 A1 May 4, 2023

(30) Foreign Application Priority Data

Nov. 3, 2021 (RU) ................................. 2021132191

(51) Int. Cl.
*G06T 7/13* (2017.01)
*G06T 3/40* (2006.01)
(Continued)

(52) U.S. Cl.
CPC .................. *G06T 7/13* (2017.01); *G06T 3/40* (2013.01); *G06T 7/155* (2017.01); *G06T 7/168* (2017.01);
(Continued)

(58) Field of Classification Search
CPC .. G06T 7/13; G06T 3/40; G06T 7/155; G06T 7/168; G06T 7/90; G06T 2207/20061;
(Continued)

(56) References Cited

U.S. PATENT DOCUMENTS 7,672,507 B2 * 3/2010 Fan ......................... G06T 7/162
382/199
8,645,818 B2 * 2/2014 Kuwata .............. H04N 1/00188
715/243

(Continued)

FOREIGN PATENT DOCUMENTS

CN 105096299 B * 2/2019

OTHER PUBLICATIONS

Contour and Texture Analysis for Image Segmentation, Jitendra Malik, Serge Belongie, Thomas Leungâand Jianbo Shi (Year: 2001).*
(Continued)

*Primary Examiner* — Chan S Park
(74) *Attorney, Agent, or Firm* — Hayes Soloway PC

(57) ABSTRACT

Advanced Hough-Based On-Device Document Localization. In an embodiment, lines are detected in an input image of a document. The lines are searched for candidate quadrilaterals. For at least a subset of the found candidate quadrilaterals, a contour score is calculated, and the candidate quadrilaterals are saved or discarded based on their contour scores. For each saved candidate quadrilateral, a contrast score is calculated. A final candidate quadrilateral is selected, based on the combined contour and contrast scores for the saved candidate quadrilaterals, to represent the borders of the document.

20 Claims, 13 Drawing Sheets

(51) Int. Cl.
    *G06T 7/155*     (2017.01)
    *G06T 7/168*     (2017.01)
    *G06T 7/90*     (2017.01)
    *G06V 30/414*     (2022.01)

(52) U.S. Cl.
    CPC .............. *G06T 7/90* (2017.01); *G06V 30/414*
      (2022.01); *G06T 2207/20061* (2013.01); *G06T*
      *2207/30176* (2013.01)

(58) Field of Classification Search
    CPC ........ G06T 2207/30176; G06V 30/414; G06V
      10/17; G06V 10/48
    See application file for complete search history.

(56) References Cited

U.S. PATENT DOCUMENTS

| | | | | |
|---|---|---|---|---|
| 10,134,163 | B2 | 11/2018 | Liu et al. | |
| 2013/0101229 | A1* | 4/2013 | Holeva | G06T 7/13 |
| | | | | 382/224 |
| 2013/0182002 | A1* | 7/2013 | Macciola | G06V 10/25 |
| | | | | 345/589 |
| 2017/0372134 | A1* | 12/2017 | Zagaynov | G06V 10/507 |
| 2019/0164313 | A1* | 5/2019 | Ma | G06N 7/00 |
| 2022/0174182 | A1* | 6/2022 | Imaizumi | H04N 1/40012 |

OTHER PUBLICATIONS

Bulatov et al., "Smart IDReader: Document Recognition in Video Stream," 2017 14th IAPR International Conference on Document Analysis and Recognition, 2017 IEEE, pp. 39-44.

Esser et al., "Information Extraction Efficiency of Business Documents Captured with Smartphones and Tablets," In Proceedings of the 2013 ACM symposium on Document engineering, pp. 111-114.

Giovanni Buttarelli, "The EU GDPR as a clarion call for a new global digital gold standard," International Data Privacy Law, 2016, vol. 6 No. 2, pp. 77-78.

Andreeva et al., "Document recognition method based on convolutional neural network invariant to 180 degree rotation angle," Math-Net.Ru, All Russian mathematical portal, DOI: https://doi.org/10.14357/20718632190408, ИНфOPMALI,ИOHHЫIE ТЕХНOПO[ИИ И ВЫ4ИСПИ ТЕПЬHЫIE CИ CTEMЫ Apr. 2019, 87-93.

Zhang et al., "Whiteboard scanning and image enhancement," Digital Signal Processing 17 (2007) pp. 414-432.

Zhukovsky et al., "Segments Graph-Based Approach for Document Capture in a Smartphone Video Stream," 2017 14th IAPR International Conference on Document Analysis and Recognition, 2017 IEEE, pp. 337-342.

Hartl et al., "Rectangular Target Extraction for Mobile Augmented Reality Applications," 21st International Conference on Pattern Recognition (ICPR 2012), Nov. 11-15, 2012. Tsukuba, Japan, 2012 IAPR, pp. 81-84.

Skoryukina et al., "Real Time Rectangular Document Detection on Mobile Devices," Proc. of SPIE vol. 9445 94452A-1, 2015 SPIE, 6 pgs.

Tropin et al., "Improved Algorithm of ID Card Detection by a Priori Knowledge of the Document Aspect Ratio," Proc. SPIE 11605, Thirteenth International Conference on Machine Vision, 116051F (Jan. 4, 2021); doi:10.1117/12.2587029; 10 pgs.

Tropin et al., "Approach for Document Detection by Contours and Contrasts," 2020 25th International Conference on Pattern Recognition (ICPR), Milan, Italy, Jan. 10-15, 2021, 2020 IEEE, pp. 9689-9695.

Puybareau et al., "Real-Time Document Detection in Smartphone Videos," 2018 IEEE, pp. 1498-1502.

Sánchez-Rivero et al., "Capture of Identity Document Images in the Wild: Detection and Quality Assessment," Cicci 2020, 7 pgs.

Attivissimo et al., "An Automatic Reader of Identify Documents," 2019 IEEE International Conference on Systems, Man and Cybernetics (SMC), Bari, Italy. Oct. 6-9, 2019, 2019 IEEE, pp. 3525-3530.

Ngoc et al., "Document detection in videos captured by smartphones using a saliency-based method," 2019 International Conference on Document Analysis and Recognition Workshops (ICDARW), 2019 IEEE, pp. 19-24.

Leal et al., "Smartphone Camera Document Detection via Geodesic Object Proposals," 2016 IEEE, 6 pgs.

Castelblanco et al., "Machine Learning Techniques for Identity Document Verification in Uncontrolled Environments: A Case Study," MCPR 2020, LNCS 12088, pp. 271-281.

Zhu et al., "Coarse-to-fine document localization in natural scene image with regional attention and recursive corner refinement," International Journal on Document Analysis and Recognition, vol. 22, Issue 3, Sep. 2019, pp. 351-360.

Ricardo Batista das Neves Junior et al., "HU-PageScan: a fully convolutional neural network for document page crop," IET Image Process., 2020, vol. 14 Iss. 15, pp. 3890-3898.

Sheshkus et al, "Houghencoder: Neural Network Architecture for Document Image Semantic Segmentation," 2020 IEEE, pp. 1946-1950.

Martin L. Brady, "A Fast Discrete Approximation Algorithm for the Radon Transform," SIAM J. Comput., vol. 27, No. 1, Feb. 1998, pp. 107-119.

Javed et al., "Real-time Document Localization in Natural Images by Recursive Application of a CNN," 2017 14th IAPR International Conference on Document Analysis and Recognition, 2017 IEEE, pp. 105-110.

Burie et al., "ICDAR2015 Competition on Smartphone Document Capture and OCR (SmartDoc)," 2015 13th International Conference on Document Analysis and Recognition (ICDAR), 2015 IEEE, pp. 1161-1165.

Arlazarov et al., "MIDV-500: a dataset for identity document analysis and recognition on mobile devices in video stream," Computer Optics 2019, 43(5), pp. 818-824.

Chazalon et al., "A Semi-Automatic Groundtruthing Tool for Mobile-Captured Document Segmentation," 2015 13th International Conference on Document Analysis and Recognition (ICDAR), 2015 IEEE, pp. 621-625.

Konovalenko et al., "Maximal Coordinate Discrepancy as Accuracy Criterion of Image Projective Normalization for Optical Recognition of Documents," Bulletin of the South Ural State University. Ser. Mathematical Modelling, Programming & Computer Software (Bulletin SUSU MMCS), 2020, vol. 13, No. 3, pp. 43-58.

Chiron et al., "ID documents matching and localization with multi-hypothesis constraints," 2020 25th International Conference on Pattern Recognition (ICPR), Milan, Italy, Jan. 10-15, 2021, 2020 IEEE, pp. 3644-3651.

Tropin et al., "Advanced Hough-based method for on-device document localization." КOMПЫIOTephaя OøTИKa 45.5 (2021), 12 pgs.

* cited by examiner $$\frac{|C_0 D_0|}{|A_0 D_0|} = r$$

410

420

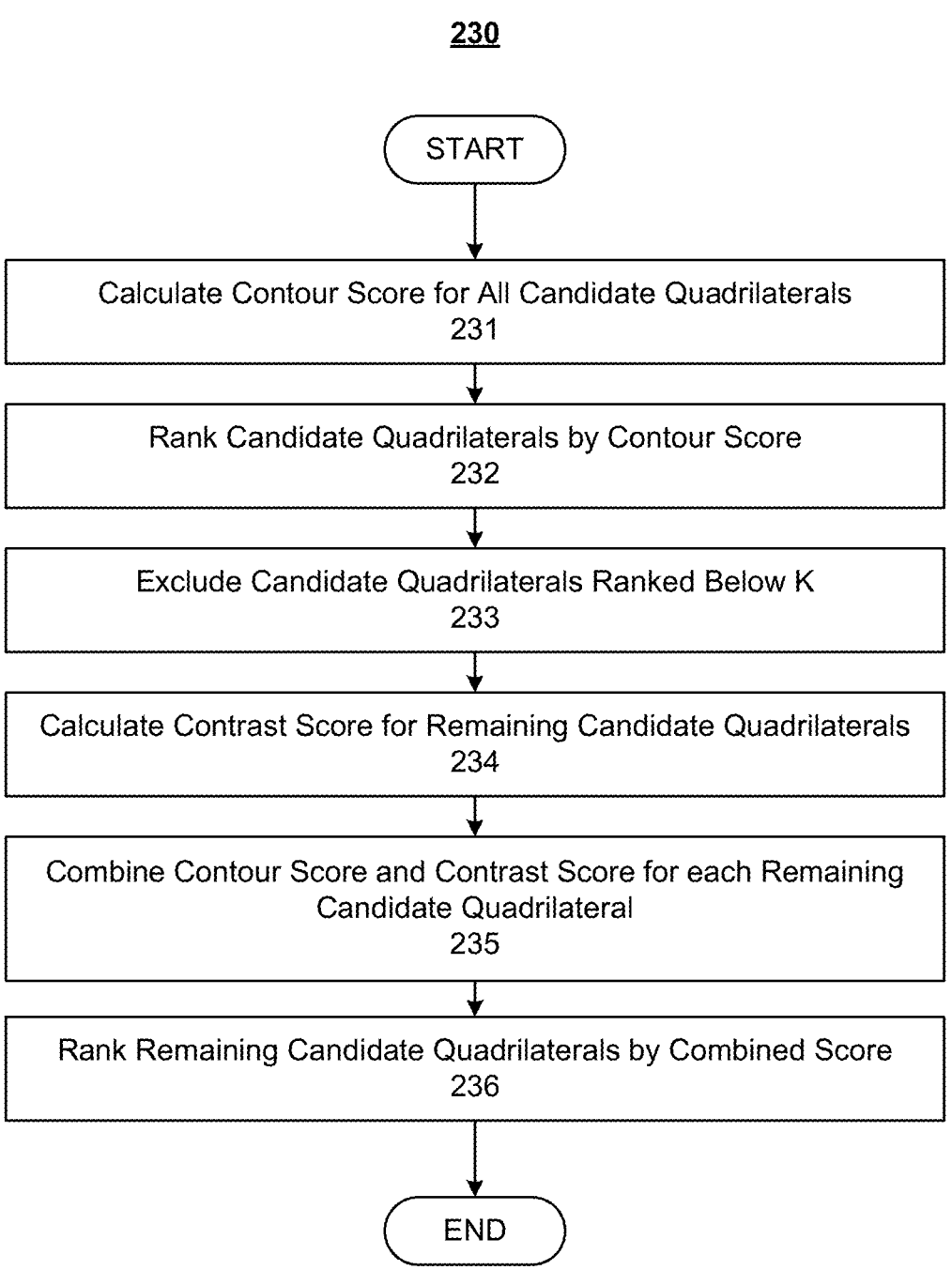

230

START

Calculate Contour Score for All Candidate Quadrilaterals
231

Rank Candidate Quadrilaterals by Contour Score
232

Exclude Candidate Quadrilaterals Ranked Below K
233

Calculate Contrast Score for Remaining Candidate Quadrilaterals
234

Combine Contour Score and Contrast Score for each Remaining
Candidate Quadrilateral
235

Rank Remaining Candidate Quadrilaterals by Combined Score
236

END

ADVANCED HOUGH-BASED ON-DEVICE DOCUMENT LOCALIZATION

CROSS-REFERENCE TO RELATED APPLICATIONS

This application claims priority to Russian Patent App. No. 2021132191, filed on Nov. 3, 2021, which is hereby incorporated herein by reference as if set forth in full.

BACKGROUND

Field of the Invention

The embodiments described herein are generally directed to document recognition, and, more particularly, to document localization that is suitable for the resource constraints imposed by a mobile device, such as a smartphone.

Description of the Related Art

Systems for recognizing documents in images are used in various institutions and industries, such as customs, transport, banking, trade, and telecommunications. See, e.g., Ref1 and Ref2. The development of stricter privacy and security standards (see, e.g., Ref3) has increased the demand for on-device document recognition, such that no data needs to be transferred to third-party document-recognition servers. On-device document-recognition systems are used for remote authentication in car-sharing rentals, automating bank card entry for online shopping, business card scanning, and the like. To improve the user experience when interacting with such systems, the response time of the system should be minimized. However, typically such systems are implemented on mobile devices (e.g., smartphones), which generally have limited processing power and memory. Thus, what is needed is a document-recognition algorithm that can perform accurately under such constraints.

SUMMARY

Accordingly, systems, methods, and non-transitory computer-readable media are disclosed for fast document localization to reduce the response time of a document-recognition system.

In an embodiment, a method comprises using at least one hardware processor to: receive an input image of a document; detect a plurality of edges in the document; detect a plurality of lines based on the plurality of edges; search the plurality of lines for combinations of the plurality of lines that represent a plurality of new candidate quadrilaterals; for each of at least a subset of the plurality of new candidate quadrilaterals, calculate a contour score for the new candidate quadrilateral, when a saved set of candidate quadrilaterals has not yet reached a maximum size, add the new candidate quadrilateral to the saved set, and, when the saved set of candidate quadrilaterals has reached the maximum size, when the contour score of the new candidate quadrilateral is not greater than a contour score of any candidate quadrilateral in the saved set, discard the new candidate quadrilateral, and, when the contour score of the new candidate quadrilateral is greater than a contour score of at least one candidate quadrilateral in the saved set, discard a candidate quadrilateral with a lowest contour score from the saved set, and add the new candidate quadrilateral to the saved set; after the search, for each candidate quadrilateral in the saved set, calculate a contrast score for the candidate quadrilateral, and calculate a combined score from the contour score and the contrast score calculated for the candidate quadrilateral; and select a candidate quadrilateral having a highest combined score from the saved set to represent borders of the document. The combined score may be a linear combination of the contour score and the contrast score. The at least one hardware processor may be comprised in a mobile device.

The input image may be a lower resolution version of an original image, and the method may further comprise using the at least one hardware processor to refine the selected candidate quadrilateral by: extracting a region that represents each border in the selected candidate quadrilateral; applying a similarity transformation to the selected candidate quadrilateral to produce a transformed quadrilateral, wherein the similarity transformation makes each of the extracted regions, representing a horizontal border, horizontal, makes each of the extracted regions, representing a vertical border, vertical, and scales the selected candidate quadrilateral to a higher resolution; and detecting lines in the transformed quadrilateral.

The search may comprise: searching for combinations of four lines from the plurality of lines; and searching for combinations of three lines from the plurality of lines, and, for each combination of three lines that is found, interpolating a fourth line based on the three lines and a known aspect ratio of the document.

The method may further comprise using the at least one hardware processor to, for each of the plurality of new candidate quadrilaterals, before calculating the contour score for the new candidate quadrilateral: determine whether or not an inverse image of the new candidate quadrilateral differs from an ideal rectangle representing the document by a predefined threshold difference; and, when the inverse image of the new candidate quadrilateral differs from the ideal rectangle by the predefined threshold difference, discard the new candidate quadrilateral without calculating the contour score for the new candidate quadrilateral and without adding the new candidate quadrilateral to the saved set. Determining whether or not the inverse image of the new candidate quadrilateral differs from the ideal rectangle by the predefined threshold difference may comprise calculating whether an aspect ratio of the inverse image of the new candidate quadrilateral differs from an aspect ratio of the ideal rectangle by more than a predetermined percentage. Determining whether or not the inverse image of the new candidate quadrilateral differs from the ideal rectangle by the predefined threshold difference may comprise calculating whether a difference between an angle of the inverse image of the new candidate quadrilateral and an angle of 90 degrees exceeds a predetermined number of degrees.

The contour score may be calculated as:

$$\text{Contour Score} = \frac{\sum_{\{b\}} w(b)}{1 + \sum_{\{b\}} (1 - c(b))} - \sum_{\{b\}} w'(b)$$

wherein {b} are the combination of lines in the new candidate quadrilateral, wherein w(b) is a total edge intensity inside a segment b, wherein w'(b) is a total edge intensity of segments that lie on a straight line containing segment b, do not intersect each other, have one common point within segment b, and have at least the threshold length, and wherein c(b) is a fraction of non-zero edge pixels inside segment b. The method may further comprise using the at least one hardware processor to, for each of the plurality of new candidate quadrilaterals, before calculating the contour score for the new candidate quadrilateral: determine whether or not each of w(b), w'(b), and c(b) has a value that is outside a respective range; and, when determining that any of w(b), w'(b), and c(b) have a value that is outside the respective range, discard the new candidate quadrilateral without calculating the contour score for the new candidate quadrilateral and without adding the new candidate quadrilateral to the saved set.

For each candidate quadrilateral in the saved set, the contrast score may be calculated based on an $\chi^2$ distance between red-green-blue (RGB) pixel histograms of inner areas and outer areas of the candidate quadrilateral. For each candidate quadrilateral in the saved set, the contrast score may be calculated after projectively normalizing the candidate quadrilateral.

Detecting the plurality of edges may comprise generating a horizontal edge map for primarily horizontal edges and a vertical edge map for primarily vertical edges. Generating each of the horizontal edge map and the vertical edge map may comprise: applying morphological filtering to the input image; calculating derivative values along a respective axis of the input image; averaging the derivative values; suppressing non-maxima having absolute derivative values greater than one; collecting connectivity components; and filtering the collected connectivity components, based on size, to produce remaining edges, wherein the respective edge map comprises the remaining edges. Generating each of the horizontal edge map and the vertical edge map may further comprise blurring the remaining edges using a Gaussian function.

Detecting the plurality of lines may comprise: detecting primarily horizontal lines from the horizontal edge map; and detecting primarily vertical lines from the vertical edge map. Detecting the plurality of lines may comprise, for each of the horizontal edge map and the vertical edge map: applying a Fast Hough Transform to one or more regions of the respective edge map; determining a global maximum across all of the one or more regions based on the Fast Hough Transform; selecting up to a predetermined number of local maxima within each of the one or more regions based on the global maximum; and applying an inverse of the Fast Hough Transform to the one or more regions to convert the local maxima into straight lines. Selecting up to a predetermined number of local maxima within each of the one or more regions based on the global maximum may comprise selecting a local maximum only if that local maximum exceeds a threshold percentage of the global maximum and that local maximum lies more than a threshold number of pixels away, by an $l_2$ norm, from all previously selected local maxima.

Any of the methods may be embodied in executable software modules of a processor-based system, such as a mobile device (e.g., smartphone), and/or in executable instructions stored in a non-transitory computer-readable medium (e.g., integrated in a smartphone).

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 illustrates an example two-stage ranking process for candidate quadrilaterals, according to an embodiment;

DETAILED DESCRIPTION

In an embodiment, systems, methods, and non-transitory computer-readable media are disclosed for performing document localization that is suitable for the resource constraints imposed by a mobile device. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

Figure 1:
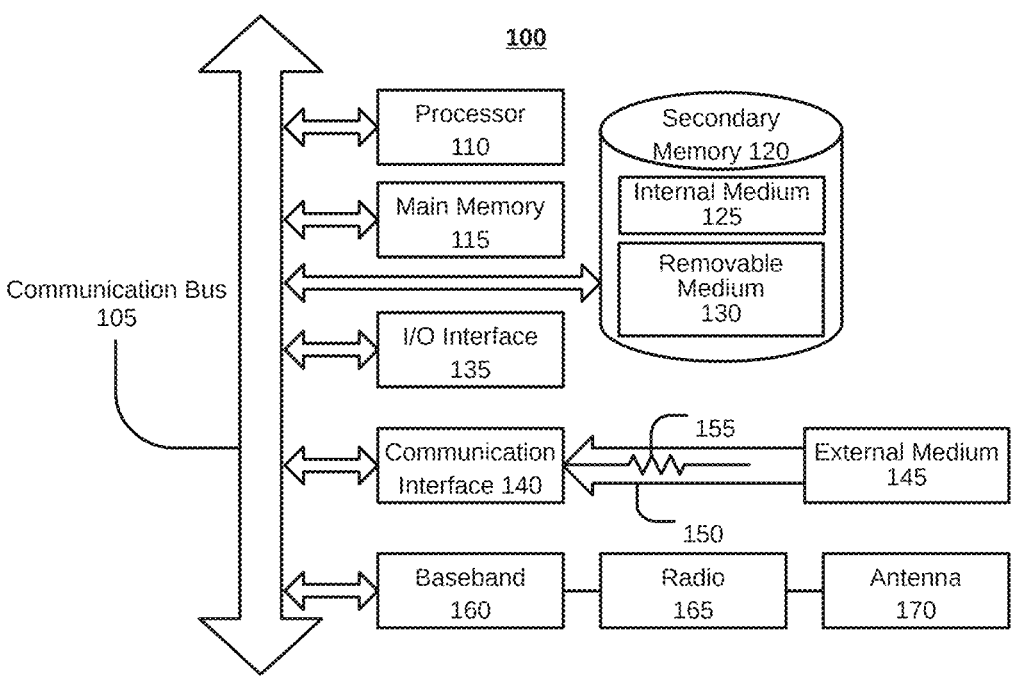
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used as or in conjunction with one or more of the functions, processes, or methods (e.g., to store and/or execute one or more software modules implementing the disclosed algorithm) described herein. System 100 can be a server or any conventional personal computer, or any other processor-enabled device that is capable of wired or wireless data communication. However, it is generally contemplated that system 100 would be a mobile device, such as a smartphone. Other computer systems and/or architectures may be also used, as will be clear to those skilled in the art.

System 100 preferably includes one or more processors 110. Processor(s) 110 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, any of the processors (e.g., A series) available from Apple Inc. of Cupertino, any of the processors (e.g., Exynos™) available from Samsung Electronics Co., Ltd., of Seoul, South Korea, any of the processors (e.g., Core™ i5 or i7) available from Intel Corporation of Santa Clara, California, and/or the like.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 100 preferably includes a main memory 115 and may also include a secondary memory 120. Main memory 115 provides storage of instructions and data for programs executing on processor 110, such as one or more of the functions and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., disclosed software modules) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or data may be transferred to system 100, over one or more networks (e.g., including the Internet), from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, comprising one or more software modules) is stored in main memory 115 and/or secondary memory 120. Computer-executable code can also be received via communication interface 140 and stored in main memory 115 and/or secondary memory 120. Such computer-executable code, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 100 may also include optional wireless communication components that facilitate wireless communication over a voice network and/or a data network. The wireless communication components comprise an antenna system 170, a radio system 165, and a baseband system 160. In system 100, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 decodes the signal and converts it to an analog signal. Then the signal is amplified and sent to a speaker. Baseband system 160 also receives analog audio signals from a microphone. These analog audio signals are converted to digital signals and encoded by baseband system 160. Baseband system 160 also encodes the digital signals for transmission and generates a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 is also communicatively coupled with processor(s) 110. Processor(s) 110 may have access to data storage areas 115 and 120. Processor(s) 110 are preferably configured to execute instructions (i.e., computer programs, such as the disclosed algorithms or software modules) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. Process Overview

Embodiments of processes for document localization will now be described in detail. It should be understood that the described processes may be embodied in one or more software modules that are executed by one or more hardware processors (e.g., processor 110), for example, as a computer program or software package. The described processes may be implemented as instructions represented in source code, object code, and/or machine code. These instructions may be executed directly by hardware processor(s) 110, or alternatively, may be executed by a virtual machine operating between the object code and hardware processors 110.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Introduction

Embodiments focus on locating or localizing a document within an image during document recognition being performed on the image. It is assumed that each document to be recognized is a rigid, flat rectangle with a known aspect ratio and unknown content. An image of the document is captured with a calibrated camera with a known back focal length and a position of the principal point. The resulting frame contains an image of only one document with the known aspect ratio. The slope of each of two opposing sides of the document is within $(-1,1]$, which will be referred to herein as "primarily horizontal." The slope of each of the other pair of opposing sides is within $(-\infty, 1]\cup(1, +\infty)$, which will be referred to herein as "primarily vertical." As is typical in hand-held photography, one side of the document may be partially or completely obscured, out of the frame, or have low contrast.

The task of document localization is to define the quadrilateral formed by the outer borders of the document. Algorithms for localizing documents with unknown content can be divided into three classes: (i) a first class based on detecting the borders of the document (referred to herein as "Hough-based," since the Hough transform is used to find the document borders); (ii) a second class based on detecting the salient region of the document; and (iii) a third class based on detecting the vertices of the document.

The first class of document-localization algorithms (i.e., Hough-based) was originally employed in Ref5, in which the following pipeline was proposed: borders detection; search for straight lines using the Hough transform; formation; filtering; ranking of quadrilaterals; and refinement of the quadrilateral with the highest rank. However, Ref5 utilizes whiteboard localization which assumes that the major part of each boundary is within the frame, has strong contrast, and is not occluded. In hand-held photography, these assumptions are often violated, resulting in a reduction in the accuracy of the document-localization algorithm. Such violation is referred to herein as the border visibility (BV) problem. The algorithm in Ref5 is also complicated by the problem of false positives (FP), which refers to the presence of extended false contrasts in the background of the image (e.g., tile, carpet, blinds, keyboard, etc.) and within the document (e.g., text lines, photographs, Portable Data File 417 (PDF417), etc.). Despite these shortcomings, Ref6 through Ref13 all employ this first class of document-localization algorithms.

The second class of document-localization algorithms is based on detecting the salient region of the document. The basic assumption in such algorithms is that there is a high contrast between the document and the background of the image. A first approach to the contrast analysis is to proceed from the general to the particular (i.e., from the model to the document). For example, Ref14 employs a quadrilateral as the model, and optimizes the position of the document by maximizing the color difference between the inner and outer areas of the quadrilateral. A second approach to the contrast analysis is to proceed from the particular to the general (i.e., from the document to the model). In particular, the position of the document is evaluated based on segmentation of the image into two classes: the document; and the background. Ref15 represents the image as an unordered tree of regions, which is obtained by hierarchical segmentation of the image. For segmentation, Ref15 uses several contrast features, including the Dahu pseudo distance and the Chi-square distance between histograms of the color sets of the pixels in the image. Ref16 uses similar features to segment the image into the two classes. These approaches to contrast analysis are stable in terms of false rectilinear contrasts present in the document and background. However, this second class of document-localization algorithms is computationally expensive, and therefore, not suitable for many mobile devices.

Neural networks may be used for segmenting the image into a document and its background, and improve robustness in the case of complex backgrounds. For example, Ref17 and Ref18 employ the original U-net neural network. There are millions of parameters in such networks. Thus, research has concentrated on reducing the number of parameters. For example, Ref19 modified the U-net architecture to reduce the number of parameters by more than 70%, and Ref20 reduced the number of parameters by a factor of 100 using the Fast Hough Transform (see, e.g., Ref21). However, the employment of neural networks on mobile devices, such as smartphones, remains difficult.

The third class of document-localization algorithms is based on detecting the vertices of the document. See, e.g., Ref6, Ref18, and Ref22. Since there may be abundant false angles in the image, a region of interest (ROI) is employed to improve the stability of the algorithms. Ref18 employs a U-net to estimate the region of interest, and Ref22 uses a convolutional neural network (CNN) to estimate the region of interest. In contrast, Ref6 does not use a region of interest. Rather, Ref6 searches for angles in the image, but only to complement the primary algorithm that is based on detecting the borders of the document.

Only a handful of existing document-localization algorithms account for the constraints imposed by an on-device application (e.g., on a smartphone). In Ref7 and Ref8, high-frequency structures filtering is used to overcome the FP problem. In Ref9, the quadrilaterals are formed by straight lines gained by no filtered edges. Since the ratio of sides is known, triplets of the sides can be used to form a quadrilateral, in addition to the standard method that employs the intersection of four sides. This improves the output quality of the algorithm, especially when one document border is not visible in the image. Ref10 suggests ranking quadrilaterals, based on the edge characteristics along the document borders, and accounting for the contrast between the foreground and the background of the quadrilateral. Inspired by salience-based algorithms, Ref11 employs the watershed algorithm to extract contours in the image, prior to searching for straight lines in the image. Ref7 and Ref8 were not evaluated on open datasets, and Ref10 and Ref11 were evaluated on the open dataset SmartDoc (see Ref23), but did not achieve state-of-the-art scores. Ref9 and Ref10 were evaluated on the open dataset Mobile Identity Document Video (MIDV)-500 (see Ref24).

In an embodiment, the disclosed document-localization algorithm uses a Hough-based approach that is capable of operation on a resource-constrained device, such as a smartphone. The modifications proposed in Ref9 and Ref10 may be used to make the document-localization algorithm more reliable in terms of FP and BV problems. When evaluated on the SmartDoc dataset, the disclosed algorithm outperformed all other methods in terms of precision, with the exception of a U-net-like neural network. When evaluated on the more challenging MIDV-500 dataset (i.e., in terms of background clutter), the disclosed algorithm guaranteed the best performance in terms of precision.

2.2. General Algorithm

Figure 2:
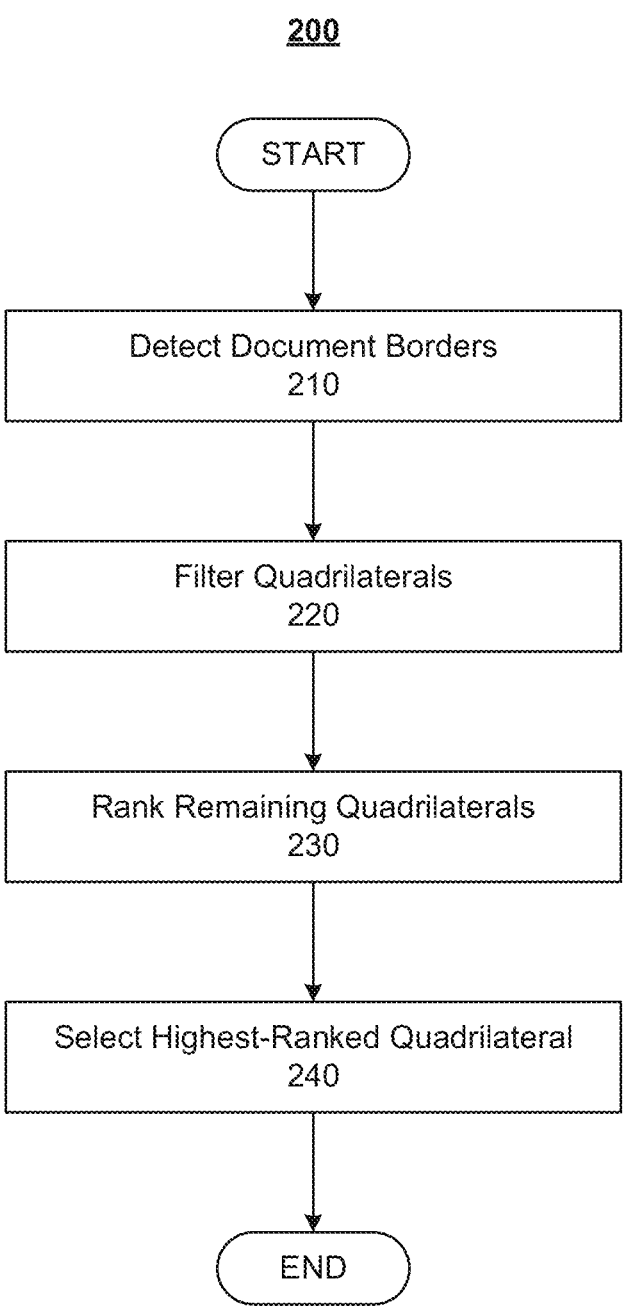
FIG. 2 illustrates the pipeline of an example document-localization process, according to an embodiment.

FIG. 2 illustrates the pipeline of an example document-localization process 200, according to an embodiment. Process 200 may be implemented in software that is entirely executed by a processor 110 on a mobile device (e.g., comprising system 100) to operate on an image that has been captured by a camera integrated into the mobile device. The mobile device is generally contemplated to be a smartphone. However, process 200 may be utilized in other types of mobile devices (e.g., laptop computers, tablet computers, etc.), as well as in non-mobile devices (e.g., desktop computers, electronic kiosks, servers, etc.).

In subprocess 210, quadrilaterals are detected. In particular, subprocess 210 may search for each combination of four straight lines in the input image that intersect to form a quadrilateral. Subprocess 210 may also search for three intersecting straight lines (i.e., triplet) in the input image and reconstruct or interpolate a fourth straight line representing the fourth side of a quadrilateral, as described in Ref9. Subprocess 210 may reconstruct the fourth straight line, from the found triplet of straight lines, using the known aspect ratio of the document and the internal parameters (e.g., position of the principal point and focal length) of the camera that captured the input image. If the internal parameters of the camera are unknown, it can be assumed that the principal point lies in the center of the image and the focal length equals k*d, wherein k is the focal factor (e.g., 0.7) and d is a diagonal of the image at the working resolution.

To simulate the camera, the model of a pinhole camera may be used, with a center at O, a focal length, and a known position of the principal point. In a situation in which two horizontal lines and one vertical line have been detected for the quadrilateral, the analytical solution of the fourth line of the quadrilateral is reduced to the calculation of the vertical vanishing point. In particular, the known vertical line is intersected with a plane that (i) is perpendicular to the horizontal vanishing point, and (ii) passes through the center O of the camera. Notably, the algorithm proposed in Ref9 is analytical and requires a constant number of calculations.

Figure 3:
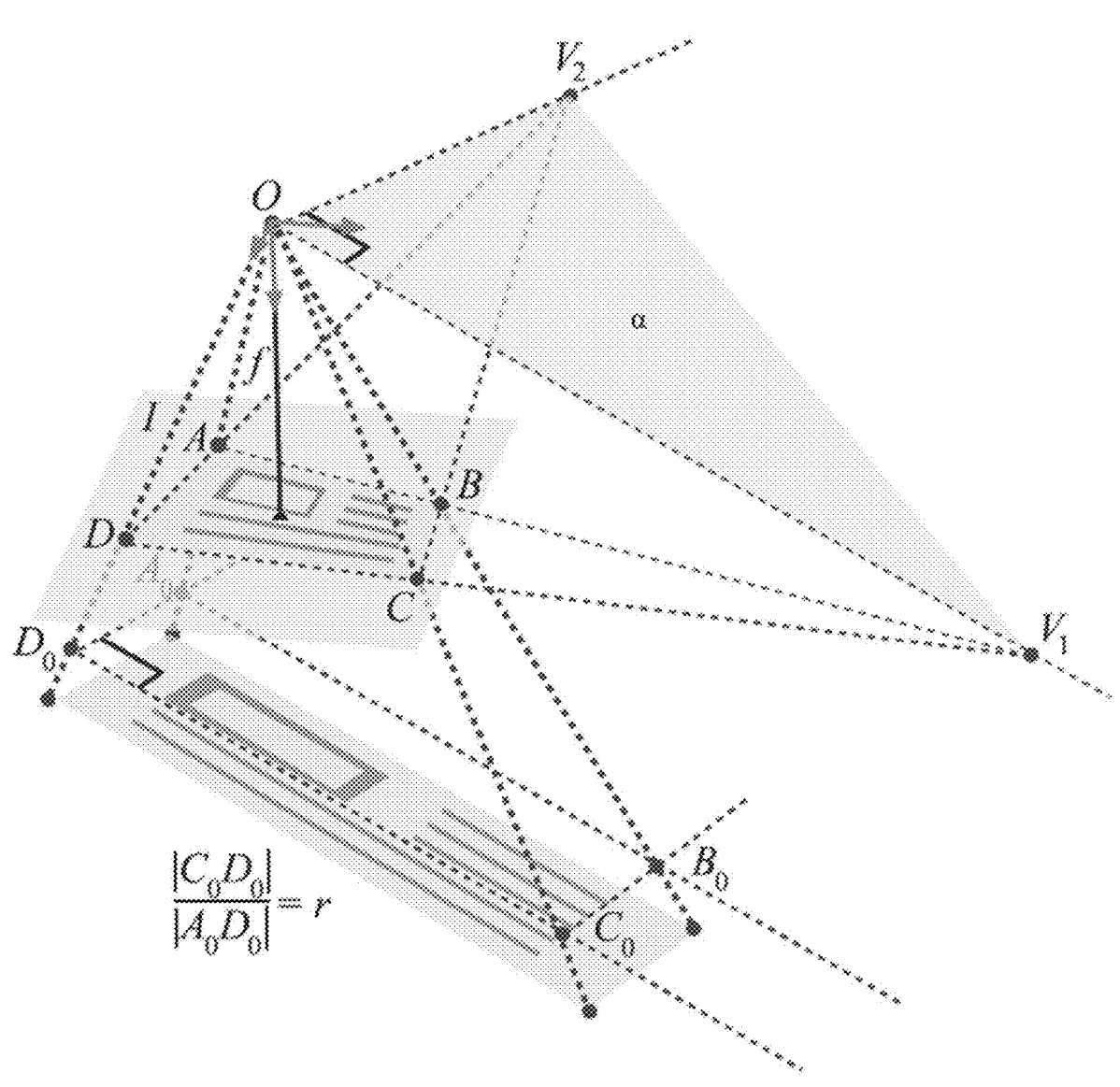
FIG. 3 illustrates a transformation using a model of a pinhole camera, according to an embodiment.

In subprocess 220, the detected quadrilaterals are filtered based, for example, on known geometric properties of the document being localized. As illustrated in FIG. 3, in the model of a pinhole camera, the projection of a rectangular document on an image plane is generally a quadrilateral. This transformation is performed by the central projection of the document in the three-dimensional world onto the image plane. To perform the inverse transformation, the tetrahedral angle OABCD, formed by the center of the camera O and the quadrilateral ABCD of the document image, is dissected by the plane $\alpha$. The plane $\alpha$ is parallel to the plane $OV_1V_2$, in which $V_1$ and $V_2$ are the vanishing points. To obtain the coordinates of the inverse image, the quadrilateral ABCD is projected onto the plane $\alpha$. If the quadrilateral ABCD is the true image of the document, the inverse image will be a rectangle with the aspect ratio of the document. In the general case, for any convex quadrilateral on the image plane, the inverse image will be a parallelogram. Notably, the inverse transformation does not preserve the document's original scale.

In an embodiment, all of the quadrilaterals, detected in the input image (i.e., formed by four intersecting lines), are filtered based on the difference between a resulting parallelogram and a rectangle with a known aspect ratio, as described for instance in Ref9. For example, detected quadrilaterals, whose parallelogram (having an aspect ratio r) differs from a rectangle with the known aspect ratio by more than a predefined threshold difference, may be excluded from further processing by subsequent subprocesses 230 and 240. Thus, subprocess 220 reduces computational load by excluding clearly incorrect quadrilaterals from further consideration. The output of subprocess 220 is a set of one or more candidate quadrilaterals from among all of the detected quadrilaterals output by subprocess 210.

In subprocess 230, all of the candidate quadrilaterals, remaining after the filtering of subprocess 220, are ranked based, for example, on contours and contrasts. In particular, the contours of each quadrilateral q may be scored based on the integral characteristics of the contours along the lines or borders {b} of the quadrilateral q. These characteristics may include the intensity w of the edges inside the borders {b}, the intensity w' of the edges outside of the borders {b}, and the shares of non-zero pixels c on the edge map along the borders {b}. See, e.g., Ref5 and Ref8. In an embodiment the contour score C may be calculated as (see Ref10):

$$C = \frac{\sum_{\{b\}} w(b)}{1 + \sum_{\{b\}} (1 - c(b))} - \sum_{\{b\}} w'(b) \qquad \text{Equation (1)}$$

wherein w(b) is the total intensity of the edge map inside the border b, wherein w'(b) is the total edge intensity along segments outside the border b, wherein the segments (i) do not intersect each other, (ii) have one common point with border b, and (iii) have at least a threshold length (e.g., 10 pixels), and wherein c(b) is the fraction of non-zero pixels along the edge map inside the border b. The computational complexity of calculating the contour score C for a single quadrilateral q is O(1), provided that there are precomputed arrays of integral statistics along the lines of the borders {b}.

To improve performance for complex image backgrounds, contrast estimation may be performed on all of the candidate quadrilaterals. See, e.g., Ref10. The contrast estimation for a quadrilateral q may comprise calculating a contrast score based on the $\chi^2$ distance between the red-green-blue (RGB) pixel histograms of the inner and outer areas of the quadrilateral q. In order for the contrast score to be independent of the size of the candidate quadrilaterals, the candidate quadrilaterals may be projectively normalized prior to calculation of their respective $\chi^2$ distances.

Figures 4A, 4B, 4C:
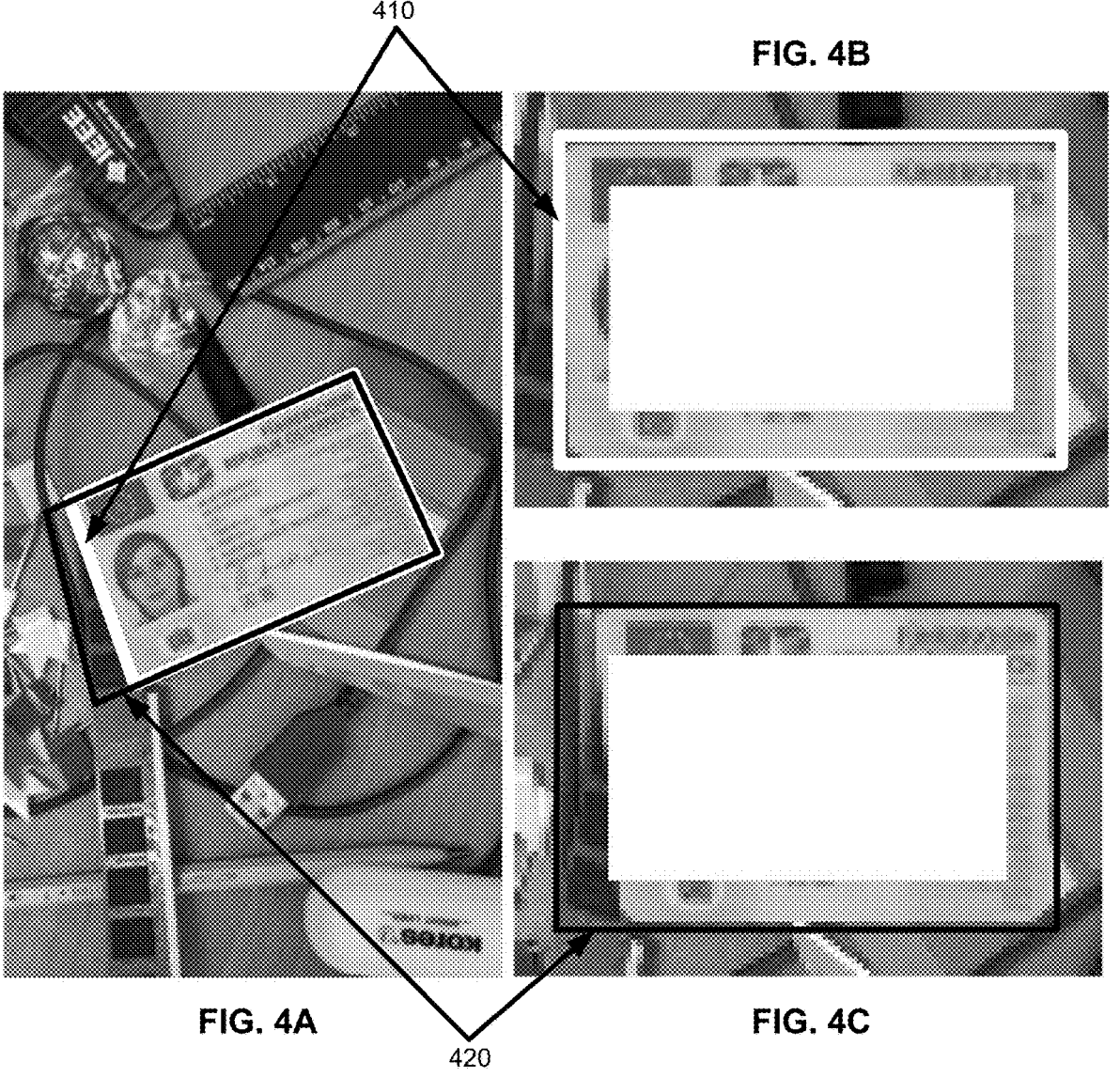
FIGS. 4A-4C illustrate an example scenario for illustrating contour and contrast scoring, according to an embodiment.

FIGS. 4A-4C illustrate an example scenario to illustrate contour and contrast scoring, according to an embodiment. FIG. 4A illustrates the input image with the true quadrilateral 410 shown with a white border and the false quadrilateral 420 shown with a black border, while FIGS. 4B and 4C illustrate the projectively normalized true quadrilateral 410 and false quadrilateral 420, respectively. In FIGS. 4B and 4C, only the inner area, between the quadrilateral borders and the white rectangle in the center of each quadrilateral 410 and 420, is used for contrast scoring. In this case, true quadrilateral 410 has a lower contour score than false quadrilateral 420, because the left border of true quadrilateral 410 is less precise than the left border of false quadrilateral 420. For example, in testing, the contour score for true quadrilateral 410 was 9,063, whereas the contour score for false quadrilateral 420 was 10,919. However, true quadrilateral 410 has a higher contrast score than false quadrilateral 420, because the left side of true quadrilateral 410 has higher contrast between the inner and outer areas than the left side of false quadrilateral 420. For example, in testing, the contrast score for true quadrilateral 410 was 170, whereas the contrast score for false quadrilateral 420 was 143.

The contour and contrast scores may be combined in any suitable manner (e.g., weighted sum, weighted average, etc.) to obtain the ranking of each candidate quadrilateral in subprocess 230. For example, in the above example, the contour and contrast scores were linearly combined, with the coefficient of the contour score being 0.011 and the coefficient of the contrast score being 1, such that the rounded combined score for true quadrilateral 410 was 270 (i.e., 9063*0.011+170) and the rounded combined score for false quadrilateral 420 was 263 (i.e., 10919*0.011+143). Accordingly, true quadrilateral 410 was selected over false quadrilateral 420.

In an embodiment, since the calculation of the contrast score is computationally expensive, the ranking in subprocess 230 may be performed in a two-stage ranking process. FIG. 5 illustrates an example two-stage ranking process for the candidate quadrilaterals in subprocess 230, according to an embodiment. In subprocess 231, the contour score is calculated for all of the candidate quadrilaterals. In subprocess 232, the candidate quadrilaterals are ranked according to their contour scores (e.g., from highest to lowest contour score). In subprocess 233, any quadrilateral whose rank is below the Kth place is excluded, where K is a suitable integer designed to exclude clearly false quadrilaterals (e.g., based on empirical testing). In subprocess 234, the contrast score is calculated for all of the remaining candidate quadrilaterals that were not excluded in subprocess 233 (i.e., all candidate quadrilaterals from 1st to Kth place). In subprocess 235, the contour score and contrast score are combined for each of the remaining candidate quadrilaterals. The contour score and contrast score may be combined in any suitable manner. For example, in a particular implementation, the contour score is linearly combined with the contrast score, with the contour score being multiplied by a constant of 0.011 in the linear combination and the contrast score not being multiplied by any constant or being multiplied by a constant of 1. In subprocess 236, the remaining candidate quadrilaterals, from subprocess 235, are ranked according to the combined scores calculated for the remaining candidate quadrilaterals.

2.3. Detailed Algorithm

Figure 6A:
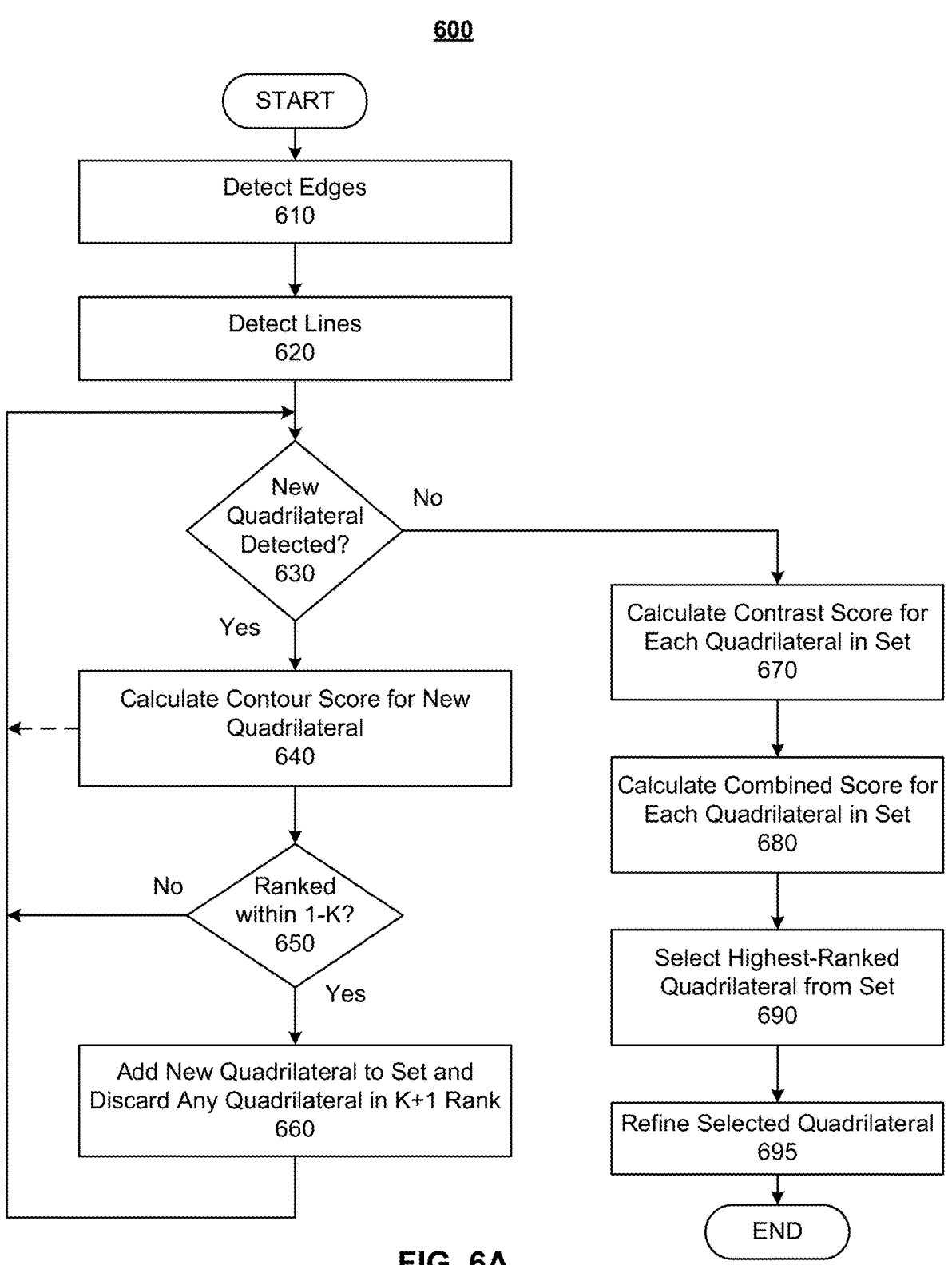
FIGS. 6A-6D illustrate a detailed algorithm for document localization, according to an embodiment.

FIG. 6A illustrates the detailed algorithm 600 for document localization, according to an embodiment. Algorithm 600 may be implemented in software that is entirely executed by a processor 110 on a mobile device (e.g., comprising system 100) to operate on an image that has been captured by a camera integrated into the mobile device. The mobile device is generally contemplated to be a smartphone. However, process 600 may be utilized in other types of mobile devices (e.g., laptop computers, tablet computers, etc.), as well as in non-mobile devices (e.g., desktop computers, electronic kiosks, servers, etc.).

To reduce the image noise, the input image may be compressed isotropically, such that the shortest side of the compressed input image is a predefined number of pixels (e.g., 240 pixels). Since the document borders are two pairs of primarily horizontal and primarily vertical borders, the search for edges and lines may be divided into two similar or identical processes: one for detecting primarily horizontal borders; and one for detecting primarily vertical borders.

Figure 6B:
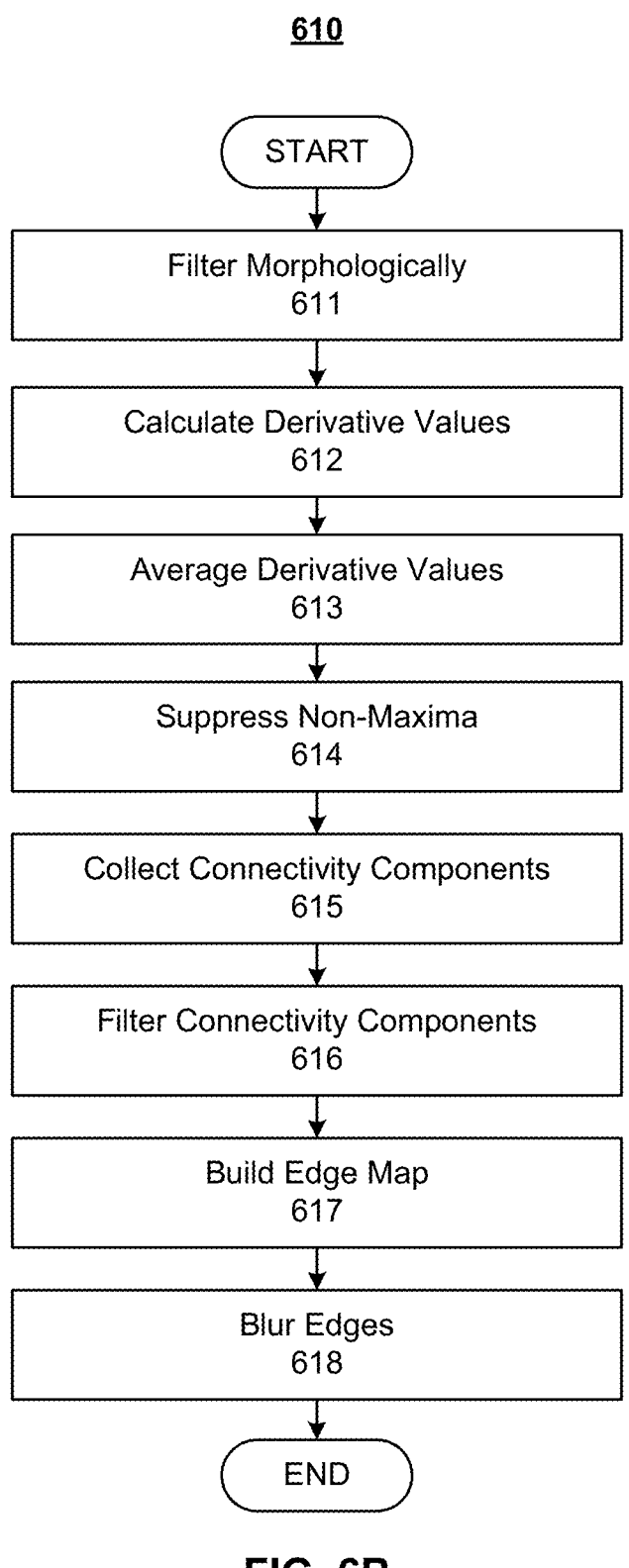
Figures 7A, 7B:
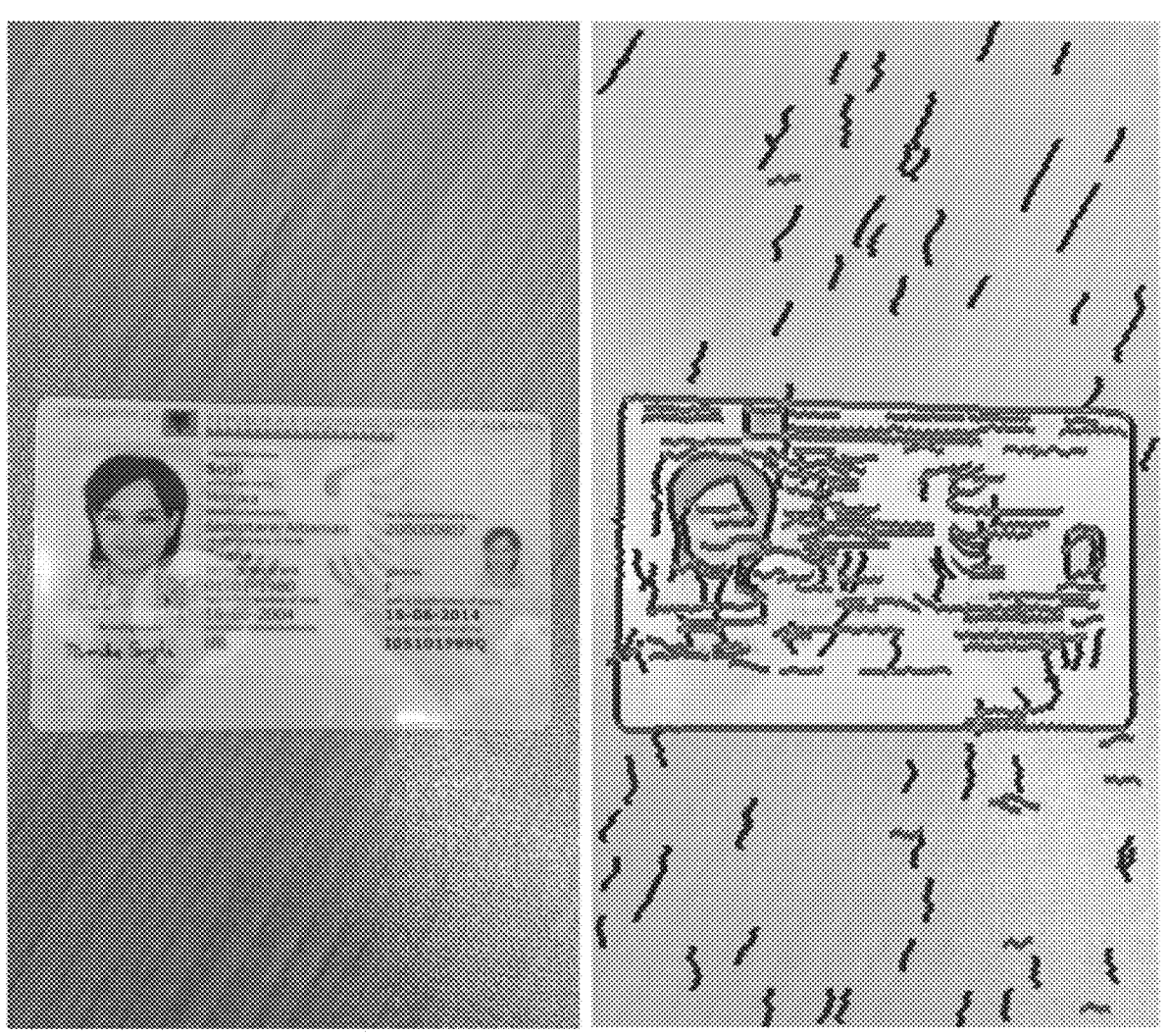
FIGS. 7A-7E illustrate examples of the application of the document-localization algorithm to an example input image, according to an embodiment.

In subprocess 610, edges are detected in the input image. FIG. 6B illustrates an example of subprocess 610, according to an embodiment. Subprocess 610 may be performed once to detect primarily horizontal edges and once to detect primarily vertical edges, either serially or in parallel. In step 611, channel-by-channel morphological filtering is applied to the input image. Firstly, an opening operation is applied to the input image with a window wing of one pixel, and secondly, a closing operation is applied to the input image with the same window. This filters local minima (i.e., valleys) and local maxima (i.e., ridges) with a width of two pixels. Step 611 may be performed independently for each column of pixels (for horizontal edge detection) or each row of pixels (for vertical edge detection). As used herein, the term "column" refers to a structural vertical element of the input image with a width of one pixel, and the term "row" refers to a structural horizontal element of the input image with a height of one pixel. In step 612, the derivative values along the Y-axis (for horizontal edge detection) or the X-axis (for vertical edge detection) are calculated, with a kernel filter of $(1,-1)$. In step 613, the derivative values are averaged over each of the RGB channels. In step 614, non-maxima inside each column or row, with pixels having absolute derivative values greater than one, are suppressed. In step 615, the connectivity components (horizontally connected for horizontal edge detection, and vertically connected for vertical edge detection) are collected. In an embodiment, three pixels on either side of each pixel (immediately left and right for horizontal edge detection, and immediately above and below for vertical edge detection) are considered that pixel's neighbors. In step 616, the collected connectivity components are filtered by size. For instance, all of the connectivity components may be excluded whose lengths are less than a predetermined percentage (e.g., 10%) of the minimum of (i) the length of the maximum component, and (ii) the length of half the width of the input image. In step 617, an edge map is built from the same constant values at points covered by the remaining connectivity components. FIG. 7A illustrates an example input image, and FIG. 7B illustrates the edge maps for both the primarily horizontal and primarily vertical edges, according to an implementation. Finally, in step 618, the edges are blurred using the Gaussian function. Step 618 may be performed independently for each column or row of pixels. As mentioned above, subprocess 610 is performed twice: once for primarily horizontal edges; and once for primarily vertical edges. Thus, the output of subprocess 610 is two edge maps: one for primarily horizontal edges; and one for primarily vertical edges.

Figure 6C:
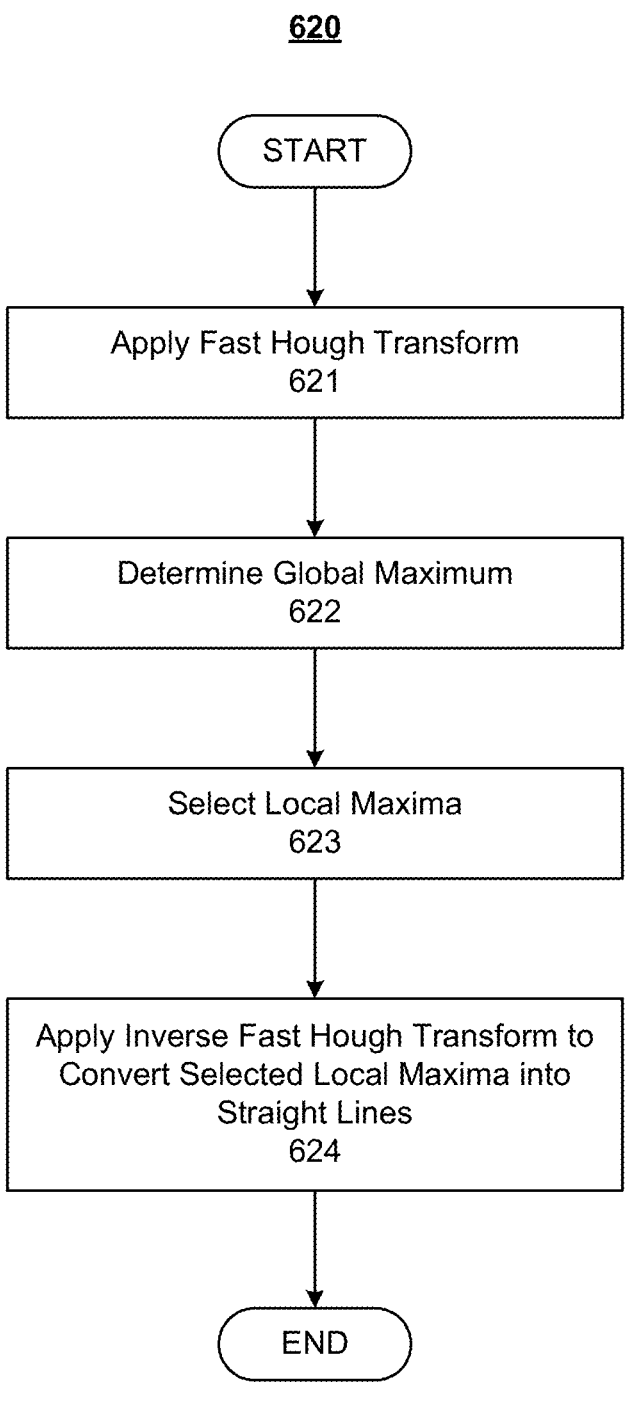

Returning to FIG. 6A, in subprocess 620, lines are detected from the two edge maps that are output by subprocess 610. FIG. 6C illustrates an example of subprocess 620, according to an embodiment. In the event that one dimension of the input image is greater than the other dimension of the input image, the input image—and more particularly, the edge maps output by subprocess 610—may be divided into a plurality of non-overlapping regions in the greater dimension. For example, the input image in FIG. 7A is greater in the vertical dimension than the horizontal dimension. Thus, the input image may be divided into N (e.g., three) roughly equal, non-overlapping regions in the vertical dimension, and each of the N regions may be separately searched for primarily vertical lines, whereas the search for primarily horizontal lines is performed over the full input image as a single region. It should be understood that, in cases in which the horizontal dimension is greater than the vertical dimension, the input image may be divided into M regions in the horizontal dimension, and not divided in the vertical dimension. In cases in which the horizontal dimension is equal to the vertical dimension, the input image may not be divided in either dimension. In alternative implementations, whether the input image is a square or rectangle, the input image may be divided into a plurality of regions in both dimensions (e.g., N×M regions). It should be understood that subprocess 620 is performed for both the horizontal dimension and the vertical dimension, either serially or in parallel.

Figure 7C:
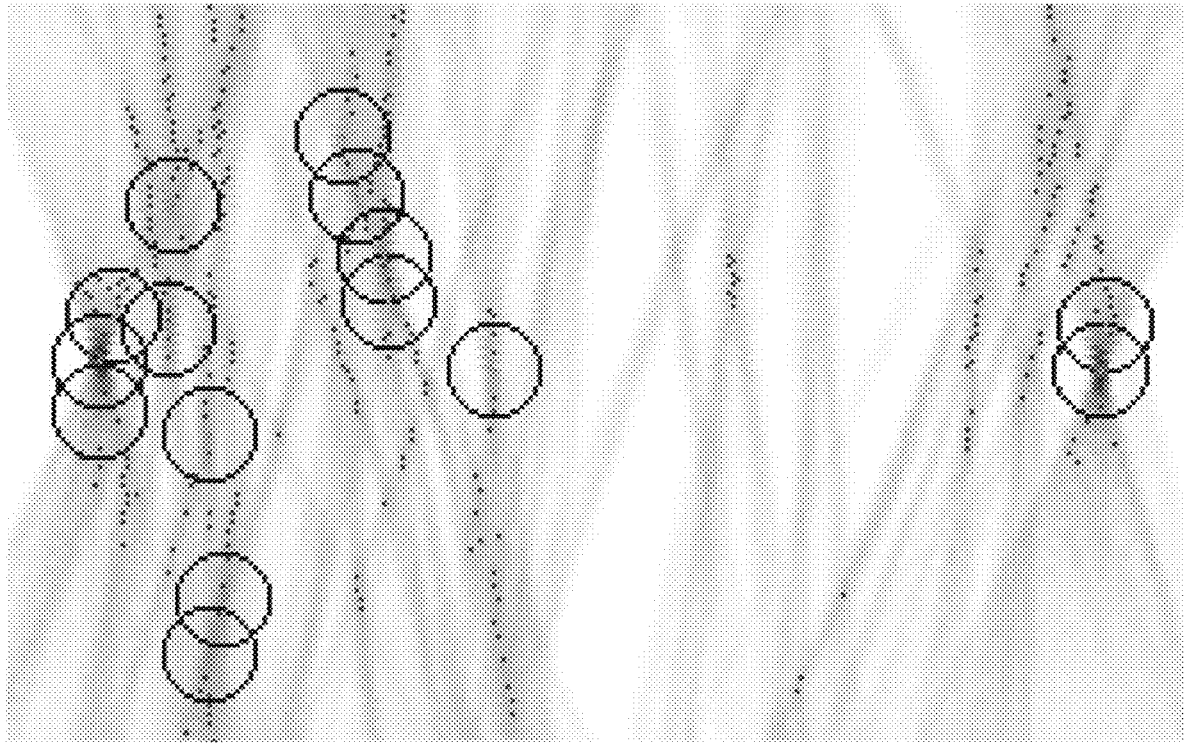
Figure 7D:
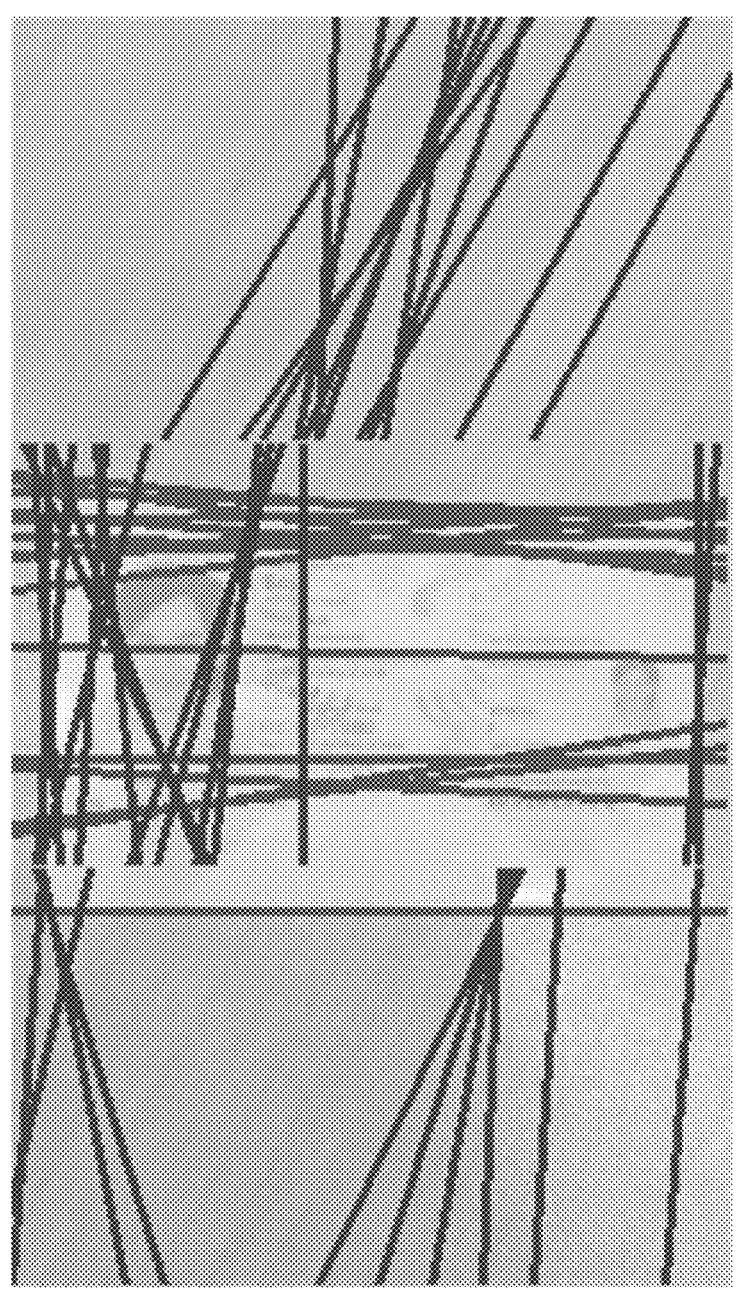

In step 621, the Fast Hough Transform (FHT) is applied to each region in the given dimension (e.g., in the illustrated example, to each of the N=3 regions in the vertical dimension, and to the single region in the horizontal dimension). In step 622, the global maximum for the entire dimension is determined. In the event that the input image has been divided into a plurality of regions along a dimension, the global maximum for that dimension is the maximum across all of the plurality of regions (e.g., across all N=3 regions in the horizontal dimension in the illustrated example). In step 623, up to a predetermined number (e.g., fifteen) of local maxima are sequentially selected in each region in the given dimension (e.g., in the illustrated example, in each of the N=3 regions in the vertical dimension, and in the single region in the horizontal dimension). In an embodiment, a local maximum is selected only if both (i) the local maximum exceeds a threshold percentage (e.g., 20%) of the global maximum in the given dimension, and (ii) the local maximum lies more than a threshold number of pixels (e.g., ten pixels) away, by the $l_2$ norm, from all previously selected local maxima (if any). FIG. 7C illustrates an FHT image of the middle region of the edge map for the vertical dimension, in an implementation. The local maxima are shown by dots, with the selected local maxima (e.g., fifteen in this implementation) and their respective neighborhoods illustrated by circles. The true vertical borders of the document are marked by squares. In step 624, the selected local maxima for all regions in the given dimension are converted into straight lines using the inverse Fast Hough Transform. FIG. 7D illustrates the straight lines detected, in an implementation. As shown, in the illustrated example, forty-five lines were detected in the vertical dimension, and fifteen lines were detected in the horizontal dimension, since the predetermined number of local maxima that were selected in step 623 was fifteen (i.e., 15 multiplied by 3 regions in the vertical dimension, and 15 multiplied by 1 region in the horizontal dimension). The output of subprocess 620 is a set of primarily horizontal straight lines and primarily vertical straight lines.

Returning to FIG. 6A, in subprocess 630, it is determined whether or not a new candidate quadrilateral can be formed from the set of primarily vertical and primarily horizontal lines detected in subprocess 620. In subprocess 630, new candidate quadrilaterals may be detected by performing a consecutive brute force search over the set of lines, output by subprocess 620, to create sets of four lines (i.e., two primarily vertical lines and two primarily horizontal lines) and, in an embodiment, sets of a triplet (i.e., three lines consisting of either two primarily vertical lines and one primarily horizontal line or one primarily vertical line and two primarily horizontal lines) with a reconstructed or interpolated fourth line. If a new candidate quadrilateral can be formed from the set of lines (i.e., "Yes" in subprocess 630), algorithm 600 proceeds to subprocess 640. Otherwise, if no new candidate quadrilaterals can be formed from the set of lines (i.e., "No" in subprocess 630), algorithm 600 proceeds to subprocess 670. In other words, algorithm 600 evaluates every candidate quadrilateral that can be formed from the set of primarily vertical and primarily horizontal lines detected in subprocess 620.

In an embodiment, some of the quadrilaterals that are identified in the search for sets of four lines may be filtered out from further consideration during subprocess 630, as discussed with respect to subprocess 220 in process 200. In particular, as discussed with respect to subprocess 220, an inverse image of the document may be reconstructed. The shape of this image is a parallelogram. If the difference between the parallelogram and the ideal rectangle, representing the shape of the document, exceeds a predefined threshold difference, the parallelogram is discarded (i.e., not detected as a candidate quadrilateral in subprocess 630). For example, the difference may be a difference between the aspect ratio r and the known aspect ratio of the document, in which case the predefined threshold difference may be a predetermined percentage (e.g., 7%), and/or a difference between the angle of the parallelogram and 90 degrees, in which case the predefined threshold difference may be a predetermined number of degrees (e.g., 5 degrees). In an embodiment, if either of these threshold differences are satisfied, the parallelogram is discarded. Notably, it generally only makes sense to perform this type of filtration on sets of four lines. During the search for three lines, this type of filtration is useless, since all of the quadrilaterals that are produced from three lines and an interpolated fourth line already correspond to the central projective model of the rectangle with a known aspect ratio.

In subprocess 640, a contour score is calculated for the new candidate quadrilateral. The contour score may be calculated as discussed elsewhere herein. For example, the contour score may be calculated as the contour score C using Equation (1). Before or during calculation of the contour score C, all of the new candidate quadrilateral's components (i.e., w, c, and w') may be compared to ranges, represented by minimum and maximum thresholds. In an embodiment, if the components are not within the allowed range between the minimum and maximum thresholds, the new candidate quadrilateral may be immediately discarded before completing the calculation of the contour score, and algorithm 600 may return to subprocess 630 (shown by dashed arrow in FIG. 6A) to determine whether or not any new candidate quadrilaterals remain to be considered.

The contour score of a quadrilateral includes a reward (i.e., the total intensity w inside the four borders {b}), and a penalty (i.e., based on the fraction of non-zero pixels c and the intensity w' outside of the four borders {b}). If the value of the reward of the new candidate quadrilateral is less than that of a K number of previously scored candidate quadrilaterals, there is no reason to further consider the new candidate quadrilateral, and therefore, it may be discarded.

Thus, in subprocess 650, the new candidate quadrilateral is ranked, with respect to any previously saved candidate quadrilaterals, according to the contour score calculated in subprocess 640, and then it is determined whether or not the new candidate quadrilateral is within a rank of 1 to K (e.g., K=4). If the new candidate quadrilateral is within the 1st to Kth rank in the ranking (i.e., "Yes" in subprocess 650), algorithm 600 proceeds to subprocess 660. Otherwise, if the new candidate quadrilateral is lower than the Kth rank, the new candidate quadrilateral is discarded, and algorithm 600 returns to subprocess 630. It should be understood that in the first to Kth iteration of subprocess 650, the result of subprocess 650 will always be "Yes," such that algorithm 600 can skip subprocess 650 and proceed directly from subprocess 640 to subprocess 660.

In subprocess 660, the new candidate quadrilateral is added to a saved set (e.g., heap) of candidate quadrilaterals. In addition, the candidate quadrilateral that was previously at the Kth rank and which has now been shifted to the (K+1)th rank is discarded. Thus, the maximum size of the heap of candidate quadrilaterals is constant and is always equal to K. For example, if K=4, the size of the heap will never exceed 4.

After all candidate quadrilaterals have been detected in subprocess 630 (i.e., "No" in subprocess 630), indicating that no new candidate quadrilaterals can be formed from the set of lines output by subprocess 620, algorithm 600 proceeds to subprocess 670. In subprocess 670, a contrast score is calculated for each candidate quadrilateral in the saved set. It should be understood that the number of candidate quadrilaterals in the saved set—and therefore, the number of candidate quadrilaterals for which the contrast score must be calculated—will never be greater than K. Thus, the computationally expensive calculation of the contrast score is limited to a maximum of K iterations. As discussed elsewhere herein, the contrast score may be calculated based on the $\chi^2$ distance.

In subprocess 680, for each of the K candidate quadrilaterals, the contrast score calculated for that candidate quadrilateral in subprocess 670 is combined with the contour score that was calculated for that candidate quadrilateral in subprocess 640 and stored in the saved set. As discussed elsewhere herein, the combination of contour score and contrast score may be a linear combination, such as:

Combined=$a$×Contour+$b$×Contrast wherein a and b are constants. In a particular implementation, a=0.011 and b=1. In subprocess 690, the candidate quadrilateral with the highest combined score is selected as the quadrilateral, representing the localization of the document in the input image.

Figure 7E:
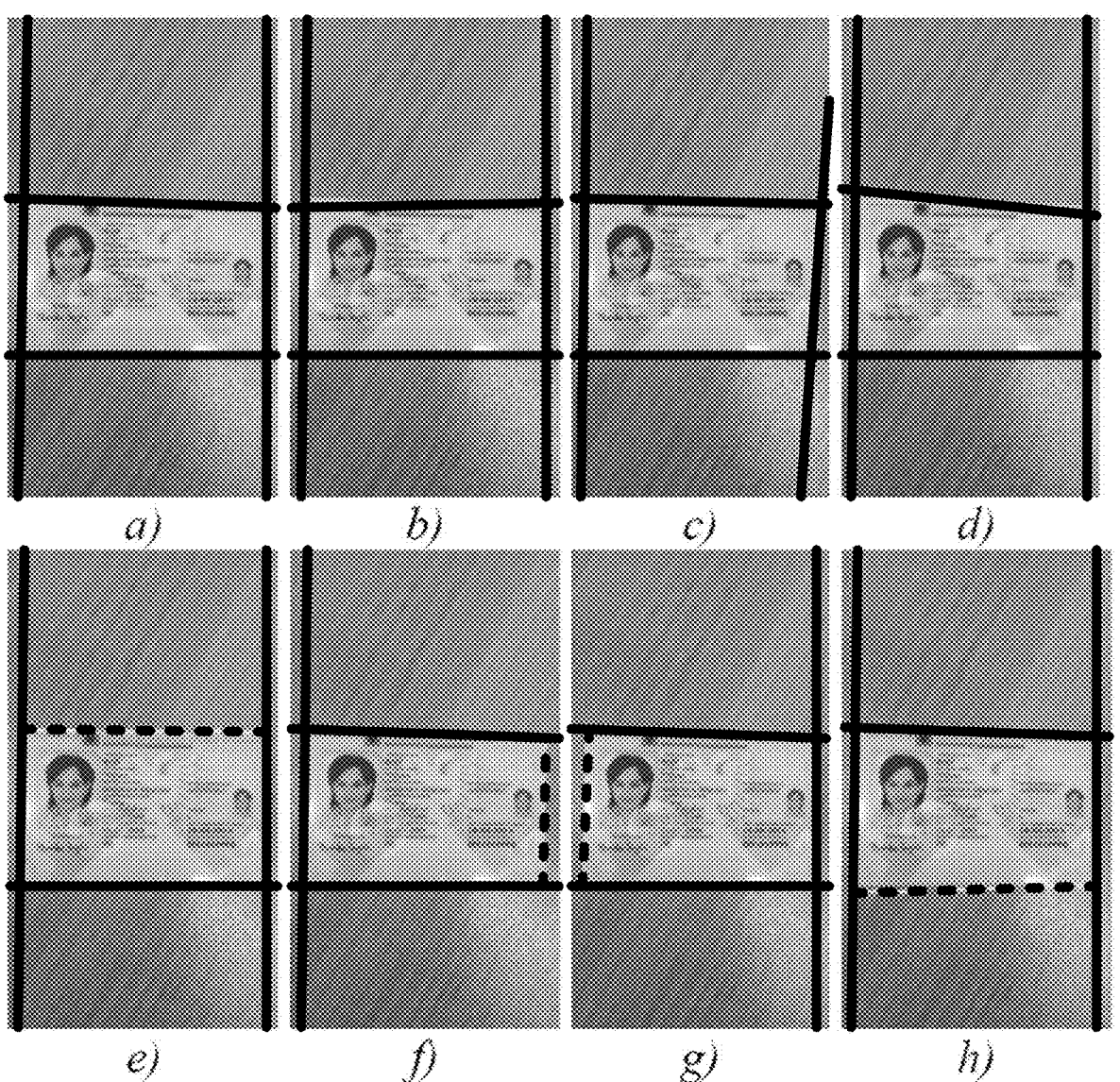

FIG. 7E illustrates the resulting candidate quadrilaterals from a brute force search of the example input image in FIG. 7A. The top row in FIG. 7E illustrates the top K=4 candidate quadrilaterals from a search by four lines, and the bottom row in FIG. 7E illustrates the top K=4 candidate quadrilaterals from a search by three lines, with the interpolated line represented by a dashed line, as determined by an example implementation of algorithm 600. In this example, in terms of the combined score, the rank of the top four candidate quadrilaterals, from highest score to lowest score, was: (a), (e), (f), and (b). Thus, in subprocess 690, candidate quadrilateral (a) would be selected as the final localization of the document.

Figure 6D:
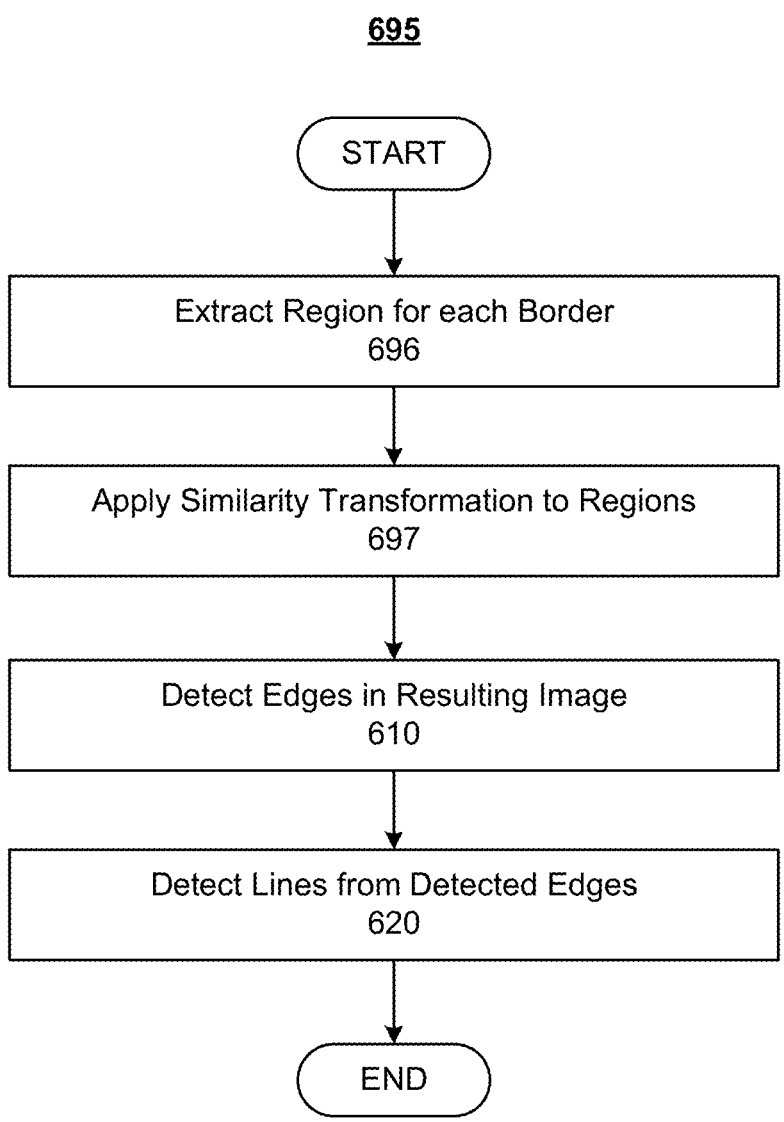

In an embodiment in which the image was compressed to a working resolution (e.g., shortest side of 240 pixels), the quadrilateral, selected in subprocess 690, may be refined in subprocess 695. In particular, since the working resolution (e.g., 240 by 426) for algorithm 600 is less than the original resolution (e.g., 4.5 times less), the detected document borders, as represented by the selected quadrilateral, may be refined (e.g., at a scale of 3 times the working resolution) to increase the accuracy of the document localization at the original resolution. FIG. 6D illustrates an example of subprocess 695, according to an embodiment. For example, in subprocess 696, a region may be extracted for each of the detected document borders. Each region may be a rectangle formed by indents of N pixels (e.g., N=2 pixels) in the perpendicular direction from the border. Then, in subprocess 697, a similarity transformation may be applied to each of the resulting regions to make them (i) horizontal in the horizontal borders or vertical in the vertical borders, and (ii) scaled at X times (e.g., X=3) the working resolution. Then, subprocesses 610 and 620 may be applied to the resulting image of the document at the upscaled resolution. For example, the edge map and the Fast Hough Transform are calculated for the image, the global maximum is evaluated, and the refined position of each document border is calculated by the inverse Fast Hough Transform of the corresponding maximum in the FHT image. The result is an image of the document at or near the original resolution.

3. Experimentation

Algorithm 600 was tested on two open datasets of document images captured by smartphone cameras: SmartDoc (see, e.g., Ref23) and MIDV-500 (see, e.g., Ref24).

SmartDoc includes about 25,000 images of A4-sized pages. Each image is associated with a ground-truth quadrilateral obtained in semi-automatic mode. See Ref 25. SmartDoc is divided into five parts, but only the first four parts were used for testing, since only these four parts include images of a single document with a known aspect ratio. The fifth part of SmartDoc includes images of an A4-sized page on top of a stack of papers, such that the borders of other A4-sized pages are visible in the image. Thus, it would be impossible to distinguish the target document from another page in the stack based solely on borders. Rather, information about the content of the target document would be required.

MIDV-500 includes 15,000 images of 50 different types of identity documents. The images have been captured under several conditions, including different backgrounds (e.g., table, keyboard, clutter, etc.), with the document resting on a surface and held in a hand, and with the document wholly within the frame and partially outside the frame. All of the images, including those in which the imaged document is partially outside the frame, are associated with a ground-truth quadrilateral that has been manually marked. In addition to the ground-truth quadrilateral, all of the images are associated with a known aspect ratio of the imaged document.

3.1. Problems and Metrics

A metric of quality, which is based on the maximum discrepancy between vertices, was used to evaluate the algorithm's performance in document localization. In particular, the index introduced in Ref9 was used to evaluate algorithm 600. This index is based on the maximum discrepancy between the vertices of the quadrilateral q, output by algorithm 600, and the ground-truth quadrilateral m, within the coordinate system of quadrilateral q. The discrepancy D may be calculated as:

$$D(q, m, t) = \max_i \frac{\|t_i - Hm_i\|_2}{P(t)} \qquad \text{Equation (2)}$$

wherein t is a rectangle with linear sizes of the document template, H represents a homography such that Hq=t, and P(t) is a perimeter of the template.

Since the quadrilateral of the document should be defined precisely up to the vertices renumbering, the index is calculated as follows:

$$\text{Min}D(q,m,t)=\min_{q^i \in Q} D(q^{(i)},m,t) \qquad \text{Equation (3)}$$

wherein Q={[a, b, c, d]; [b, c, d, a]; [c, d, a, b]; [d, a, b, c]} is a set of quadrilaterals gained by renumbering the vertices of quadrilateral q.

Intersection-over-Union IoU is used in the case of segmentation into two classes (i.e., foreground and background):

$$IoU(q, m) = \frac{\text{area}(q \cap m)}{\text{area}(q \cup m)} \qquad \text{Equation (4)}$$

This metric is more universal, since it can be used to evaluate both the quality of the segmentation and the quality of the detection of the quadrilateral formed by the document borders. According to the SmartDoc competition protocol, the metric in Equation (4) must be calculated in the coordinate system of the ideal quadrilateral:

$$IoU^{gt}(q, m, t) = \frac{\text{area}(Mq \cap t)}{\text{area}(Mq \cup t)}$$

wherein M is a homography, such that Mm=t.

The second variation of the metric in Equation (4) is denoted Mean Intersection-over-Union MeanIoU, which may be calculated as follows:

$$\text{Mean } IoU(q, m, I) = \frac{1}{2}\left(\frac{cnt_1(I_q \cap I_m)}{cnt_1(I_q \cup I_m)} + \frac{cnt_1(\overline{I_q} \cap \overline{I_m})}{cnt_1(\overline{I_q} \cup \overline{I_m})}\right)$$

wherein $I_q$ and $I_m$ are corresponding binary masks of q and m, respectively, with the same size as the input image I, and $cnt_1$ is a count of the true pixels in the input image I.

3.2. Results

To measure the run-time of algorithm 600, an iPhone 6 with an Apple A8 CPU and 1 gigabyte (GB) of RAM was used in single-threading mode. Algorithm 600 was tested twice: once on 100 random images from SmartDoc; and once on 100 random images from MIDV-500. The run-time per frame for the SmartDoc subset was 65 milliseconds, and the run-time per frame for the MIDV-500 subset was 102 milliseconds. The difference in run-time between these two subsets can be explained by the overall lower number of false straight-line contrasts in the SmartDoc subset than in the MIDV-500 subset.

Table 1 below depicts the results of an evaluation of an implementation of algorithm 600 against state-of-the-art systems, using SmartDoc, according to the averaged index $IoU^{gt}$. The state-of-the-art systems are listed in descending order by the average accuracy for all four parts of SmartDoc. Based on overall accuracy, algorithm 600 did second best, surpassed only by the system of Ref19, which is based on a U-net neural network.

TABLE 1

| System | Bgr. 1 | Bgr. 2 | Bgr. 3 | Bgr. 4 | All | Run-Time (ms)/Device |
|---|---|---|---|---|---|---|
| Alg. 600 | 0.9886 | 0.9858 | 0.9896 | 0.9806 | 0.9866 | 65/Apple A8 (iPhone 6) 1 GB RAM |
| Ref19 | | [0.9912, 0.9934] | | | | 59/Intel Core i7 8700, 8 GB RAM, 6 GB Nvidia GTX 1060 |
| Ref6 | 0.9885 | 0.9833 | 0.9897 | 0.9785 | 0.9856 | unknown/unknown |
| Ref18 | 0.9876 | 0.9839 | 0.9830 | 0.9843 | 0.9848 | 564/Intel Xeon ®, 2CPU E5-2603 v4, 4GPU Nvidia-1080 |
| Ref15 | 0.9850 | 0.9820 | 0.9870 | 0.9800 | 0.9838 | 3700/Intel i7, 8 GB RAM |
| Ref10 | 0.9830 | 0.9740 | 0.9830 | 0.9700 | 0.9787 | unknown/unknown |
| Ref22 | 0.9832 | 0.9724 | 0.9830 | 0.9695 | 0.9777 | 320/Intel i5-4200U, 8 GB RAM |
| Ref16 | 0.9605 | 0.9444 | 0.9647 | 0.9300 | 0.9516 | 430/Intel i5-3570K, 16 GB RAM |
| Ref11 | 0.9050 | 0.9360 | 0.8590 | 0.9030 | 0.9007 | 40/unknown |

MIDV-500 does not offer a standard protocol for measuring the accuracy of document-localization systems. There are different quality metrics, as well as different test subsets of MIDV-500. The use of different metrics is justified, for example, when the objectives differ.

Table 2 below depicts the results of an evaluation of an implementation of algorithm 600 against state-of-the-art systems, using MIDV-500. The first four columns in Table 2 represent the accuracy metrics of four state-of-the-art systems, tested against MIDV-500. With the exception of Ref26, none of these state-of-the-art systems utilize the documents' contents for document localization. The third column of Table 2 provides a brief description of the MIDV-500 subsets against which each state-of-the-art system was tested. The fifth column of Table 2 represents the corresponding accuracy metric of algorithm 600, tested against the same MIDV-500 subsets.

| System | Metric | MIDV-500 subset (# of images) | Accuracy | Alg. 600 |
|---|---|---|---|---|
| Ref10 | Averaged IoU$^{gt}$ | Full (15000) | 0.8700 | 0.9056 |
| | | At least 3 vertices in frame (11965) | 0.9610 | 0.9788 |
| | | All 4 vertices in frame (9791) | 0.9720 | 0.9830 |
| Ref9 | Percentage of images with MinD ≤0.017 | Full (15000) | 80.50% | 82.43% |
| | | At least 3 vertices in frame (11991) | 92.66% | 94.92% |
| | | All 4 vertices in frame (9791) | 94.66% | 96.77% |
| Ref20 | Averaged MeanIoU | At least 3 vertices in frame (11965) | 0.9600 | 0.9862 |
| Ref27 | Percentage of images with IoU ≥0.9 | Percentage of document area in frame is ≥90% (13586) | 97.00% | 93.99% |

With the exception of the system in Ref19, algorithm 600 yields the highest accuracy values for the first, second, and third parts (i.e., backgrounds) of SmartDoc, and is comparable with state-of-the-art systems for the fourth part of SmartDoc. Ref18, which has greater accuracy for the fourth part of SmartDoc, uses a U-net neural network to preliminarily estimate the region of interest in the image. Notably, algorithm 600 outperforms the Hough-based systems (e.g., Ref10 and Ref11) that were specifically designed to work on smartphones.

As demonstrated in Table 2, algorithm 600 outperforms the state-of-the-art systems that do not consider the content of the documents in terms of accuracy. While the system in Ref27 outperforms algorithm 600, it generates the baseline for the document border detection using knowledge about the inner structure of the document.

The run-time and device column, in Table 1, depicts the time required per image to perform document localization, as well as the parameters of the device used to perform document localization. While the parameters of the devices were different, the data demonstrate that (i) the run-time of algorithm 600 is short, and (ii) unlike the state-of-the-art systems, algorithm 600 runs on a mobile processor that is inferior to the other devices in terms of computational resources.

The run-time of algorithm 600 was comparable to the state-of-the-art systems in Ref9 and Ref10, which used the same device and CPU mode for document localization in the MIDV-500 subsets. In particular, the run-time for Ref9 was 67 milliseconds per frame, for Ref10 was 88 milliseconds per frame, and for algorithm 600 was 102 milliseconds per frame.

4. Example Embodiment

In an embodiment, algorithm 600 is disclosed for detecting the quadrilateral formed by the outer borders of a document in an image, even when there is no prior information about the content of the document, and with sufficient performance to operate, in real time, on smartphones or other devices with relatively low computational resources. Algorithm 600 utilizes a Hough-based approach, which analyzes the visible quadrilateral outline of the document and is characterized by low computational complexity. However, unlike state-of-the-art Hough-based document-localization systems, algorithm 600 has comparable accuracy to state-of-the-art systems that solve the document-localization problem without computational constraints.

In addition to standard techniques, algorithm 600 employs geometric invariants of rectangular projections, which significantly increases the robustness of the document-localization system when one of the document borders is not visible. Furthermore, algorithm 600 employs color characteristics of bordering regions, which improves the accuracy of the document-localization system for images with a large number of edges. When combined with standard optimizations, such as multiscale analysis, algorithm 600 achieved an accuracy that is typical for algorithms without computational constraints. With respect to SmartDoc, comprising images of printed documents with arbitrary content, algorithm 600 performed second best, with an average accuracy on the $IoU^{gt}$ index of 0.985 and an average run-time of 65 milliseconds per frame on an iPhone 6 in single-threaded mode. With respect to MIDV-500, comprising images of identity documents, algorithm 600 performed the best in terms of accuracy, with an average accuracy of 0.98, and had an average run-time of 100 milliseconds per frame on a subset with a large number of false straight-line contrasts and out-of-frame documents. The average run-time of algorithm 600 demonstrates the applicability of algorithm 600 to on-device document-recognition systems. In addition, the fact that algorithm 600 outperformed all of the state-of-the-art document-localization methods on MIDV-500 is significant, because MIDV-500 contains images that simulate real-world use cases of real-time document recognition (e.g., hand-held close-up images)

5. References

Many of the following references have been referred to herein, and all of the following references are incorporated herein by reference as if set forth and full:

Ref1: Bulatov et al., "Smart IDReader: Document recognition in video stream," 14th Int'l Assoc. of Pattern Recognition (IAPR) Int'l Conference on Document Analysis and Recognition (ICDAR), 2017, 39-44, doi: 10.1109/ICDAR.2017.347.

Ref2: Esser et al., "Information extraction efficiency of business documents captured with smartphones and tablets," Proceedings of the 2013 Assoc. for Computing Machinery (ACM) Symposium on Document Engineering, 2013, 111-113, doi: 10.1145/2494266.2494302.

Ref3: Buttarelli, "The EU GDPR as a clarion call for a new global digital gold standard," Int'l Data Privacy Law, 2016, 6(2), 77-78, doi: 10.1093/idpl/ipw006.

Ref4: Andreeva et al., "Document recognition method based on convolutional neural network invariant to 180 degree rotation angle," Information Technologies and Computing Systems, 2019, 4: 87-93, doi: 10.14357/20718632190408.

Ref5: Zhang et al., "Whiteboard scanning and image enhancement," Digital Signal Processing, 17(2), 414-432, doi: 10.1016/j.dsp.2006.05.006.

Ref6: Zhukovsky et al., "Segments Graph-Based Approach for Document Capture in a Smartphone Video Stream," 14th IAPR ICDAR, 2017, 337-342, doi: 10.1109/ICDAR.2017.63.

Ref7: Hartl et al., "Rectangular target extraction for mobile augmented reality applications," Proceedings of the 21st Int'l Conference on Pattern Recognition (ICPR), 2021, 81-84.

Ref8: Skoryukina et al., "Real time rectangular document detection on mobile devices," 7th Int'l Conference on Machine Vision (ICMV), 2015, 9445: 94452A, doi: 10.1117/12.2181377.

Ref9: Tropin et al., "Improved algorithm of ID card detection by a priori knowledge of the document aspect ratio," 13th ICMV, 2021, 11605:116051F, doi: 10.1117/12.2587029.

Ref10: Tropin et al., "Approach for document detection by contours and contrasts," 25th ICPR, 2021, 9689-9695, doi: 10.1109/ICPR48806.2021.9413271.

Ref11: Puybareau et al., "Real-time document detection in smartphone videos," 25th IEEE Int'l Conference on Image Processing (ICIP), 2018, 1498-1502, doi: 10.1109/ICIP.2018.8451533.

Ref12: U.S. Pat. No. 10,134,163, to Liu et al., issued Nov. 20, 2018.

Ref13: Sanchez-Rivero et al., "A Captura de documentos de identidad en escenarios reales: Detecci on y evaluaci on de la calidad," 18th Int'l V Conferencia internacional en ciencias computacionales e informatica (CICCI), 2020.

Ref14: Attivissimo et al., "An Automatic Reader of Identity Documents," IEEE Int'l Conference on Systems, Man and Cybernetics (SMC), 2019, 3525-3530, doi: 10.1109/SMC.2019.8914438.

Ref15: Ngoc et al., "Document Detection in Videos Captured by Smartphones using a Saliency-Based Method," ICDAR Workshops, 2019, 4: 19-24, doi: 10.1109/ICDARW.2019.30059.

Ref16: Leal et al., "Smartphone camera document detection via Geodesic Object Proposals," IEEE Latin American Conference on Computational Intelligence (LA-CCI), 2016, 1-6, doi: 10.1109/LA-CCI.2016.7885735.

Ref17: Castelblanco et al., "Machine Learning Techniques for Identity Document Verification in Uncontrolled Environments: A Case Study," Pattern Recognition, Mexican Conference on Pattern Recognition (MCPR), Lecture Notes in Computer Science, Springer, 2020, 271-281, doi: 10.1007/978-3-030-49076-8_26.

Ref18: Zhu et al., "Coarse-to-fine document localization in natural scene image with regional attention and recursive corner refinement," Int'l Journal on Document Analysis and Recognition (IJDAR), 2019, 22(3): 351-360, doi: 10.1007/s10032-019-00341-0.

Ref19: das Neves et al., "HU-PageScan: a fully convolutional neural network for document page crop," IET Image Processing, 2020, 14(15): 3890-3898, doi: 10.1049/iet-ipr.2020.0532.

Ref20: Sheshkus et al., "Houghencoder: Neural Network Architecture for Document Image Semantic Segmentation," IEEE ICIP, 2020, 1946-1950, doi: 10.1109/ICIP40778.2020.9191182.

Ref21: Brady, "A fast discrete approximation algorithm for the Radon transform," Society for Industrial and Applied Mathematics (SIAM) Journal on Computing, 1998, 27(1): 107-119, doi: 10.1137/S0097539793256673.

Ref22: Javed et al., "Real-Time Document Localization in Natural Images by Recursive Application of a CNN," 14th IAPR ICDAR, 2017, 01: 105-110, doi: /10.1109/ICDAR.2017.26.

Ref23: Burie et al., ICDAR 2015 Competition on Smartphone Document Capture and OCR (SmartDoc), 13th ICDAR, 2015, 1161-1165, doi: 10.1109/ICDAR.2015.7333943.

Ref24: Arlazarov et al., "MIDV-500: a dataset for identity document analysis and recognition on mobile devices in video stream," Computer Optics 2019, 43(5): 818-824, doi: 10.18287/2412-6179-2019-43-5-818-824.

Ref25: Chazalon et al., "A semi-automatic groundtruthing tool for mobile-captured document segmentation," 13th ICDAR, 2015, 621-625, doi: 10.1109/ICDAR.2015.7333836.

Ref26: Konovalenko et al., "Maximal Coordinate Discrepancy as Accuracy Criterion of Image Projective Normalization for Optical Recognition of Documents," Bulletin of the South Ural State University, Series <Mathematical Modelling, Programming & Computer Software>, 13(3): 43-58, doi: 10.14529/mmp200304.

Ref27: Chiron et al., "ID documents matching and localization with multi-hypothesis constraints," 25th ICPR, 2021, 3644-3651, doi: 10.1109/ICPR48806.2021.9412437.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:

receive an input image of a document, the input image comprising pixel data captured by an image sensor;

detect a plurality of edges in the document by processing the pixel data of the input image;

detect a plurality of lines based on the plurality of edges using a computer-implemented line detection algorithm;

search the plurality of lines for combinations of the plurality of lines that represent a plurality of new candidate quadrilaterals;

for each of at least a subset of the plurality of new candidate quadrilaterals, calculate a contour score for each new candidate quadrilateral, when a saved set of candidate quadrilaterals has not yet reached a predetermined maximum size K, add said new candidate quadrilateral to the saved set, and, when the saved set of candidate quadrilaterals has reached the predetermined maximum size K, when the contour score of said new candidate quadrilateral is not greater than a contour score of any candidate quadrilateral in the saved set, discard the new candidate quadrilateral, and, when the contour score of said new candidate quadrilateral is greater than a contour score of at least one candidate quadrilateral in the saved set, discard a candidate quadrilateral with a lowest contour score from the saved set, and add said new candidate quadrilateral to the saved set, such that the saved set never exceeds the predetermined maximum size K;

after the search, for each candidate quadrilateral in the saved set, calculate a contrast score for each candidate quadrilateral, and calculate a combined score from the contour score and the contrast score calculated for each candidate quadrilateral; and

25 select a candidate quadrilateral having a highest combined score from the saved set to represent borders of the document.

2. The method of claim 1, wherein the input image is a lower resolution version of an original image, and wherein the method further comprises using the at least one hardware processor to refine the selected candidate quadrilateral by:

extracting a region that represents each border in the selected candidate quadrilateral;

applying a similarity transformation to the selected candidate quadrilateral to produce a transformed quadrilateral, wherein the similarity transformation makes each of the extracted regions, representing a horizontal border, horizontal, makes each of the extracted regions, representing a vertical border, vertical, and scales the selected candidate quadrilateral to a higher resolution; and detecting lines in the transformed quadrilateral.

3. The method of claim 1, wherein the search comprises:

searching for combinations of four lines from the plurality of lines; and searching for combinations of three lines from the plurality of lines, and, for each combination of three lines that is found, interpolating a fourth line based on the three lines and a known aspect ratio of the document.

4. The method of claim 1, further comprising using the at least one hardware processor to, for each of the plurality of new candidate quadrilaterals, before calculating the contour score for the new candidate quadrilateral:

determine whether or not an inverse image of the new candidate quadrilateral differs from an ideal rectangle representing the document by a predefined threshold difference; and, when the inverse image of the new candidate quadrilateral differs from the ideal rectangle by the predefined threshold difference, discard the new candidate quadrilateral without calculating the contour score for the new candidate quadrilateral and without adding the new candidate quadrilateral to the saved set.

5. The method of claim 4, wherein determining whether or not the inverse image of the new candidate quadrilateral differs from the ideal rectangle by the predefined threshold difference comprises calculating whether an aspect ratio of the inverse image of the new candidate quadrilateral differs from an aspect ratio of the ideal rectangle by more than a predetermined percentage.

6. The method of claim 4, wherein determining whether or not the inverse image of the new candidate quadrilateral differs from the ideal rectangle by the predefined threshold difference comprises calculating whether a difference between an angle of the inverse image of the new candidate quadrilateral and an angle of 90 degrees exceeds a predetermined number of degrees.

7. The method of claim 1, wherein the contour score is calculated as:

$$\text{Contour Score} = \frac{\sum\limits_{\{b\}} w(b)}{1 + \sum\limits_{\{b\}}(1 - c(b))} - \sum\limits_{\{b\}} w'(b)$$

wherein {b} are the combination of lines in the new candidate quadrilateral, wherein w(b) is a total edge intensity inside a segment b,

26 wherein w'(b) is a total edge intensity of segments that lie on a straight line containing segment b, do not intersect each other, have one common point within segment b, and have at least the threshold length, and wherein c(b) is a fraction of non-zero edge pixels inside segment b.

8. The method of claim 7, further comprising using the at least one hardware processor to, for each of the plurality of new candidate quadrilaterals, before calculating the contour score for the new candidate quadrilateral:

determine whether or not each of w(b), w'(b), and c(b) has a value that is outside a respective range; and, when determining that any of w(b), w'(b), and c(b) have a value that is outside the respective range, discard the new candidate quadrilateral without calculating the contour score for the new candidate quadrilateral and without adding the new candidate quadrilateral to the saved set.

9. The method of claim 1, wherein, for each candidate quadrilateral in the saved set, the contrast score is calculated based on an $\chi^2$ distance between red-green-blue (RGB) pixel histograms of inner areas and outer areas of the candidate quadrilateral.

10. The method of claim 9, wherein, for each candidate quadrilateral in the saved set, the contrast score is calculated after projectively normalizing the candidate quadrilateral.

11. The method of claim 1, wherein detecting the plurality of edges comprises generating a horizontal edge map for primarily horizontal edges and a vertical edge map for primarily vertical edges.

12. The method of claim 11, wherein generating each of the horizontal edge map and the vertical edge map comprises:

applying morphological filtering to the input image;

calculating derivative values along a respective axis of the input image;

averaging the derivative values;

suppressing non-maxima having absolute derivative values greater than one;

collecting connectivity components; and filtering the collected connectivity components, based on size, to produce remaining edges, wherein the respective edge map comprises the remaining edges.

13. The method of claim 12, wherein generating each of the horizontal edge map and the vertical edge map further comprises blurring the remaining edges using a Gaussian function.

14. The method of claim 11, wherein detecting the plurality of lines comprises:

detecting primarily horizontal lines from the horizontal edge map; and detecting primarily vertical lines from the vertical edge map.

15. The method of claim 14, wherein detecting the plurality of lines comprises, for each of the horizontal edge map and the vertical edge map:

applying a Fast Hough Transform to one or more regions of the respective edge map;

determining a global maximum across all of the one or more regions based on the Fast Hough Transform;

selecting up to a predetermined number of local maxima within each of the one or more regions based on the global maximum; and applying an inverse of the Fast Hough Transform to the one or more regions to convert the local maxima into straight lines.

16. The method of claim 15, wherein selecting up to a predetermined number of local maxima within each of the one or more regions based on the global maximum comprises selecting a local maximum only if that local maximum exceeds a threshold percentage of the global maximum and that local maximum lies more than a threshold number of pixels away, by an $l_2$ norm, from all previously selected local maxima.

17. The method of claim 1, wherein the combined score is a linear combination of the contour score and the contrast score.

18. The method of claim 1, wherein the at least one hardware processor is comprised in a mobile device.

19. A system comprising:

at least one hardware processor; and software configured to, when executed by the at least one hardware processor, receive an input image of a document, the input image comprising pixel data captured by an image sensor;

detect a plurality of edges in the document by processing the pixel data of the input image;

detect a plurality of lines based on the plurality of edges using a computer-implemented line detection algorithm;

search the plurality of lines for combinations of the plurality of lines that represent a plurality of new candidate quadrilaterals, for each of at least a subset of the plurality of new candidate quadrilaterals, calculate a contour score for each new candidate quadrilateral, when a saved set of candidate quadrilaterals has not yet reached a predetermined maximum size K, add said new candidate quadrilateral to the saved set, and, when the saved set of candidate quadrilaterals has reached the predetermined maximum size K, when the contour score of said new candidate quadrilateral is not greater than a contour score of any candidate quadrilateral in the saved set, discard the new candidate quadrilateral, and, when the contour score of said new candidate quadrilateral is greater than a contour score of at least one candidate quadrilateral in the saved set, discard a candidate quadrilateral with a lowest contour score from the saved set, and add said new candidate quadrilateral to the saved set, such that the saved set never exceeds the predetermined maximum size K;

after the search, for each candidate quadrilateral in the saved set, calculate a contrast score for each candidate quadrilateral, and calculate a combined score from the contour score and the contrast score calculated for each candidate quadrilateral; and select a candidate quadrilateral having a highest combined score from the saved set to represent borders of the document.

20. A non-transitory computer-readable medium having instructions stored therein, wherein the instructions, when executed by a processor, cause the processor to:

receive an input image of a document, the input image comprising pixel data captured by an image sensor;

detect a plurality of edges in the document by processing the pixel data of the input image;

detect a plurality of lines based on the plurality of edges using a computer-implemented line detection algorithm;

search the plurality of lines for combinations of the plurality of lines that represent a plurality of new candidate quadrilaterals;

for each of at least a subset of the plurality of new candidate quadrilaterals, calculate a contour score for each new candidate quadrilateral, when a saved set of candidate quadrilaterals has not yet reached a predetermined maximum size K, add said new candidate quadrilateral to the saved set, and, when the saved set of candidate quadrilaterals has reached the predetermined maximum size K, when the contour score of said new candidate quadrilateral is not greater than a contour score of any candidate quadrilateral in the saved set, discard the new candidate quadrilateral, and, when the contour score of said new candidate quadrilateral is greater than a contour score of at least one candidate quadrilateral in the saved set, discard a candidate quadrilateral with a lowest contour score from the saved set, and add said new candidate quadrilateral to the saved set, such that the saved set never exceeds the predetermined maximum size K;

after the search, for each candidate quadrilateral in the saved set, calculate a contrast score for each candidate quadrilateral, and calculate a combined score from the contour score and the contrast score calculated for each candidate quadrilateral; and select a candidate quadrilateral having a highest combined score from the saved set to represent borders of the document.

* * * * *